US011219050B2

(12) United States Patent
John Wilson et al.

(10) Patent No.: US 11,219,050 B2
(45) Date of Patent: Jan. 4, 2022

(54) SCHEDULING TIMELINES FOR MULTI-TRANSMIT RECEIVE POINT OPERATIONS

(71) Applicant: QUALCOMM Incorporated, San Diego, CA (US)

(72) Inventors: Makesh Pravin John Wilson, San Diego, CA (US); Xiaoxia Zhang, San Diego, CA (US); Mostafa Khoshnevisan, San Diego, CA (US); Arumugam Chendamarai Kannan, San Diego, CA (US); Jing Sun, San Diego, CA (US); Tao Luo, San Diego, CA (US); Jing Jiang, San Diego, CA (US); Seyedkianoush Hosseini, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 106 days.

(21) Appl. No.: 16/682,667

(22) Filed: Nov. 13, 2019

(65) Prior Publication Data

US 2020/0154466 A1   May 14, 2020

Related U.S. Application Data

(60) Provisional application No. 62/767,266, filed on Nov. 14, 2018.

(51) Int. Cl.
*H04W 72/04*   (2009.01)
*H04W 72/12*   (2009.01)
(Continued)

(52) U.S. Cl.
CPC ....... *H04W 72/1273* (2013.01); *H04L 1/1819* (2013.01); *H04L 5/0055* (2013.01); *H04W 72/1289* (2013.01)

(58) Field of Classification Search
CPC ... H04L 1/1819; H04L 5/0035; H04L 5/0053; H04L 5/0055; H04L 5/0078;
(Continued)

(56) References Cited

U.S. PATENT DOCUMENTS

2020/0077470 A1* 3/2020 Xiong ............... H04L 1/1854
2020/0100239 A1* 3/2020 Jassal ............... H04L 1/0026
2020/0281011 A1* 9/2020 Xiong ............... H04B 7/0695

FOREIGN PATENT DOCUMENTS

WO      2018204730 A1      11/2018
WO   WO-2020167914 A1 *   8/2020   ........... H04L 1/1861

OTHER PUBLICATIONS

Caict: "L1 Enhancements to Support URLLC", 3GPP Draft, 3GPP TSG RAN WG1 Meeting #94bis, R1-1811522, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Sep. 29, 2018 (Sep. 29, 2018), XP051518924, 6 pages, Retrieved from the Internet: URL: http://www.3gpp.org/ftp/tsg%5Fran/WG1%6FRL1/TSGR1%5F94b/Docs/R1%2D1811522%2Ezip. [retrieved on Sep. 29, 2018] the whole document.
(Continued)

*Primary Examiner* — Phuc H Tran
(74) *Attorney, Agent, or Firm* — Harrity & Harrity, LLP

(57) ABSTRACT

Various aspects of the present disclosure generally relate to wireless communication. In some aspects, a user equipment may determine a dropping rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP, wherein the dropping rule indicates one or more communications to be dropped when the first triggering communication starts after
(Continued)

a start of the second triggering communication and the first subsequent communication starts before a start of the second subsequent communication; and drop the one or more communications based at least in part on the dropping rule. Numerous other aspects are provided.

30 Claims, 15 Drawing Sheets

(51) Int. Cl.
*H04L 5/00* (2006.01)
*H04L 1/18* (2006.01)

(58) Field of Classification Search
CPC ............ H04L 5/0094; H04W 72/1273; H04W 72/1278; H04W 72/128
See application file for complete search history.

(56) References Cited

OTHER PUBLICATIONS

International Search Report and Written Opinion—PCT/US2019/061433—ISA/EPO—dated Feb. 20, 2020.
NTT Docomo, et al., "Physical Layer Enhancements for NR URLLC", 3GPP Draft, 3GPP TSG RAN WG Meeting #94, R1-1809163_URLLC Layer 1 Enhancement, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 11, 2018 (Aug. 11, 2018), XP051516533, 16 pages, Retrieved from the Internet: URL: http://www.3gpp.org/ftp/tsg%5Fran/WG1%5FRL1/TSGR1%5F94/Docs/R1%2D1809163%2Ezip.
Qualcomm Incorporated: "Multil-TRP Enhancements", 3GPP Draft, 3GPP TSG-RAN WG1 Meeting#95, R1-1813442 Multi-Trp Enhancements, 3rd Generation Partnership Project (3GPP), Mobile Competence Centre, 650, Route Des Lucioles , F-06921, Sophia-Antipolis Cedex, France, vol. RAN WG1, No. Spokane, WA, USA, Nov. 12, 2018-Nov. 16, 2018, Nov. 11, 2018 (Nov. 11, 2018), XP051555481, 20 pages, Retrieved from the Internet: URL:http://www.3gpp.org/ftp/Meetings%5F3GPP%5FSYNC/RAN1/Docs/R1%2D1813442%2Ezip.

* cited by examiner

SCHEDULING TIMELINES FOR MULTI-TRANSMIT RECEIVE POINT OPERATIONS

CROSS-REFERENCE TO RELATED APPLICATION

This application claims priority to U.S. Provisional Patent Application No. 62/767,266, filed on Nov. 14, 2018, entitled "SCHEDULING TIMELINES FOR MULTI-TRANSMIT RECEIVE POINT OPERATIONS," which is hereby expressly incorporated by reference herein.

FIELD OF THE DISCLOSURE

Aspects of the present disclosure generally relate to wireless communication, and to techniques and apparatuses for scheduling timelines for multi-transmit receive point (TRP) operations.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a dropping rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP, wherein the dropping rule indicates one or more communications to be dropped when the first triggering communication starts after a start of the second triggering communication and the first subsequent communication starts before a start of the second subsequent communication; and dropping the one or more communications based at least in part on the dropping rule.

In some aspects, a UE for wireless communication may include memory and one or more processors coupled to the memory. The memory and the one or more processors may be configured to determine a dropping rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP, wherein the dropping rule indicates one or more communications to be dropped when the first triggering communication starts after a start of the second triggering communication and the first subsequent communication starts before a start of the second subsequent communication; and drop the one or more communications based at least in part on the dropping rule.

In some aspects, a non-transitory computer-readable medium may store one or more instructions for wireless communication. The one or more instructions, when executed by one or more processors of a UE, may cause the one or more processors to determine a dropping rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP, wherein the dropping rule indicates one or more communications to be dropped when the first triggering communication starts after a start of the second triggering communication and the first subsequent communication starts before a start of the second subsequent communication; and drop the one or more communications based at least in part on the dropping rule.

In some aspects, an apparatus for wireless communication may include means for determining a dropping rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP, wherein the dropping rule indicates one or more communications to be dropped when the first triggering communication starts after a start of the second triggering communication and the first subsequent communication starts before a start of the second subsequent communication; and means for dropping the one or more communications based at least in part on the dropping rule.

In some aspects, a method of wireless communication, performed by a base station, may include determining a scheduling rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP, wherein the scheduling rule indicates whether the first subsequent communication is permitted to start before a start of the second subsequent communication when the first triggering communication starts after a start of the second triggering communication; and scheduling one or more communications based at least in part on the scheduling rule.

In some aspects, a base station for wireless communication may include memory and one or more processors coupled to the memory. The memory and the one or more processors may be configured to determine a scheduling rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP, wherein the scheduling rule indicates whether the first subsequent communication is permitted to start before a start of the second subsequent communication when the first triggering communication starts after a start of the second triggering communication; and schedule one or more communications based at least in part on the scheduling rule.

In some aspects, a non-transitory computer-readable medium may store one or more instructions for wireless communication. The one or more instructions, when executed by one or more processors of a base station, may cause the one or more processors to determine a scheduling rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP, wherein the scheduling rule indicates whether the first subsequent communication is permitted to start before a start of the second subsequent communication when the first triggering communication starts after a start of the second triggering communication; and schedule one or more communications based at least in part on the scheduling rule.

In some aspects, an apparatus for wireless communication may include means for determining a scheduling rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP, wherein the scheduling rule indicates whether the first subsequent communication is permitted to start before a start of the second subsequent communication when the first triggering communication starts after a start of the second triggering communication; and means for scheduling one or more communications based at least in part on the scheduling rule.

Aspects generally include a method, apparatus, system, computer program product, non-transitory computer-readable medium, user equipment, base station, transmit receive point, wireless communication device, and/or processing system as substantially described herein with reference to and as illustrated by the accompanying drawings and/or specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings.

This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
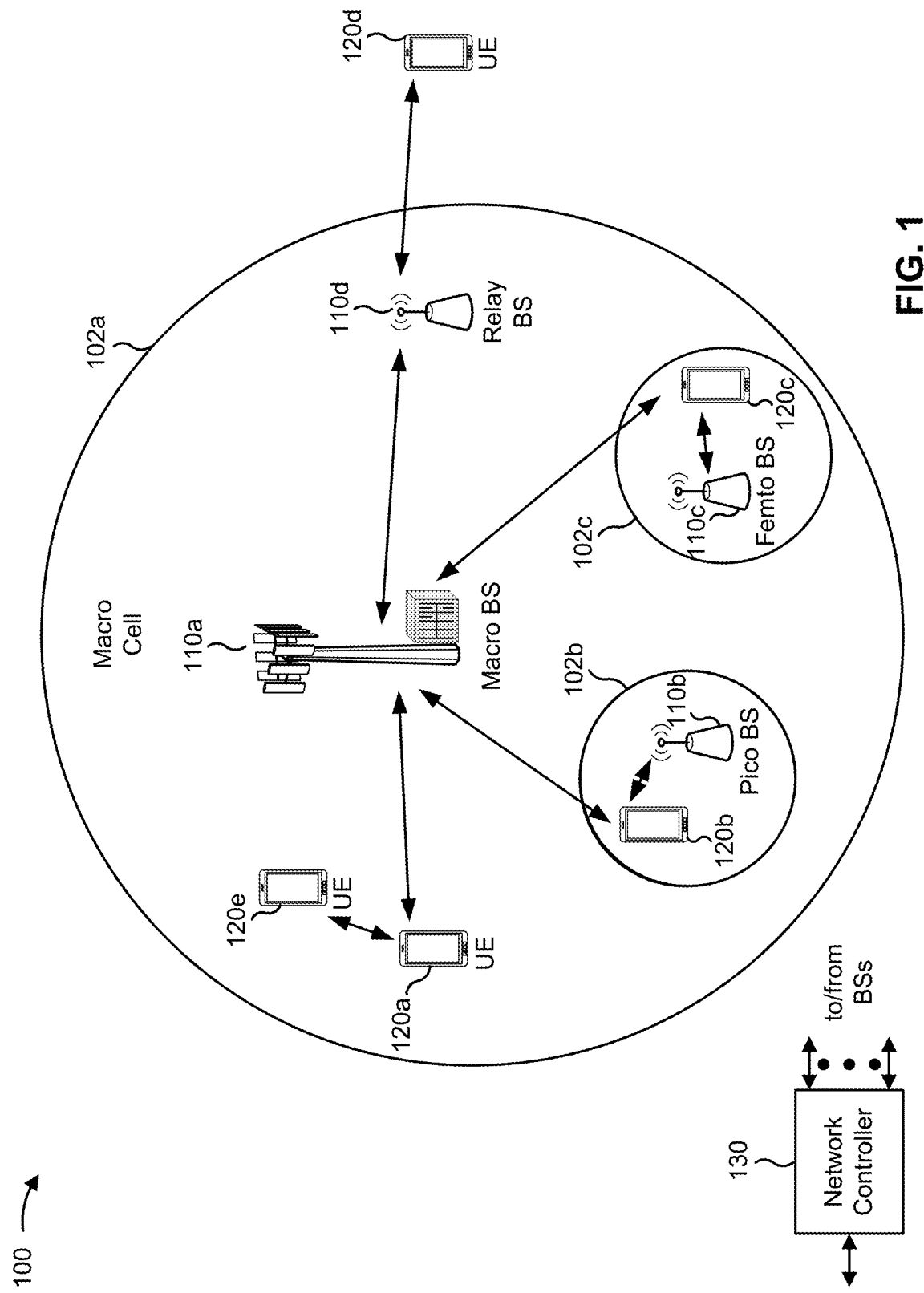
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c, 120d, 120e) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples may differ from what is described with regard to FIG. 1.

Figure 2:
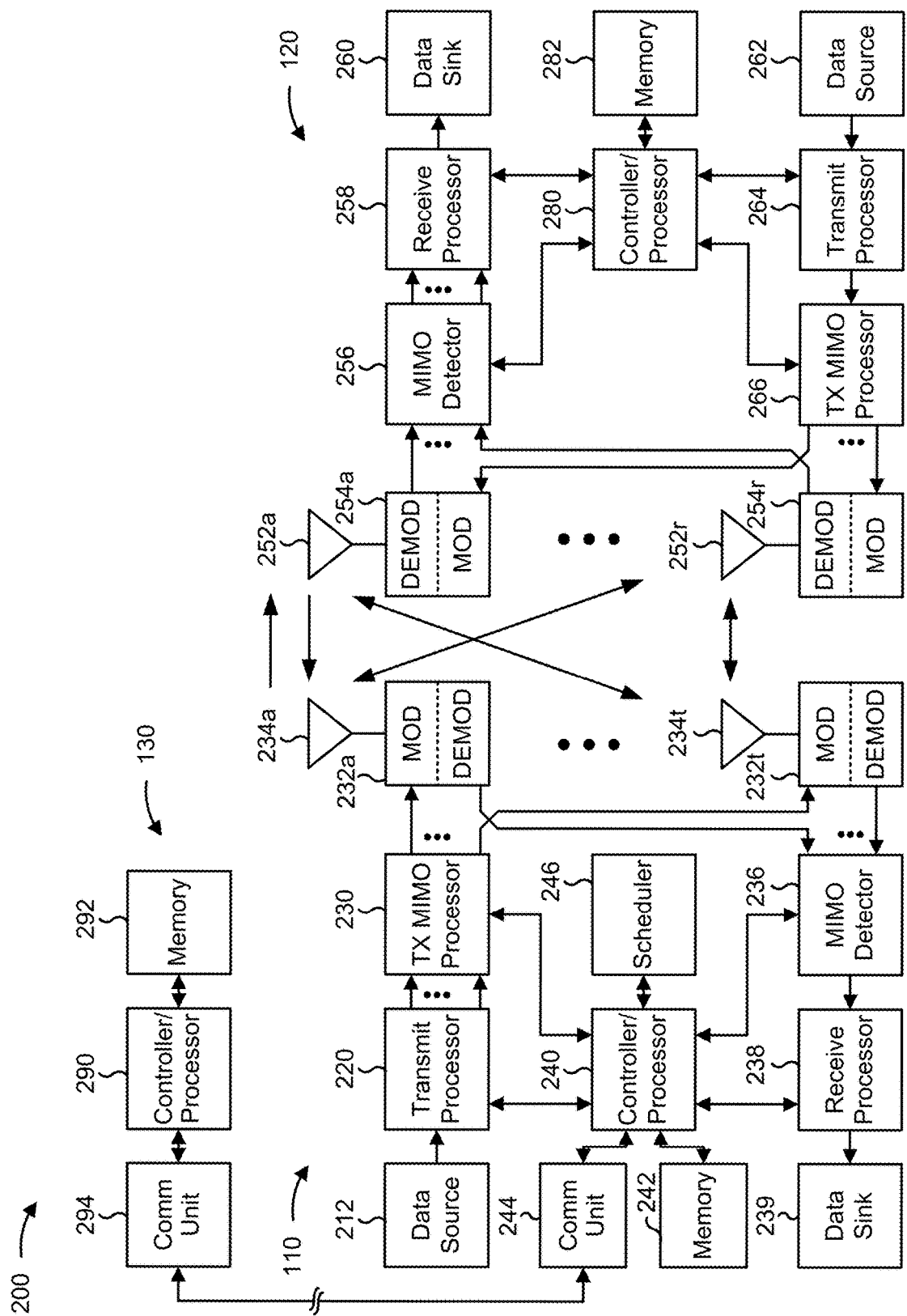
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with scheduling timelines for multi-TRP operations, as described in more detail elsewhere herein. For example, controller/processor 240 of base station 110, controller/processor 280 of UE 120, and/or any other component(s) of FIG. 2 may perform or direct operations of, for example, process 1400 of FIG. 14, process 1500 of FIG. 15, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining a dropping rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP, wherein the dropping rule indicates one or more communications to be dropped when the first triggering communication starts after a start of the second triggering communication and the first subsequent communication starts before a start of the second subsequent communication; means for dropping the one or more communications based at least in part on the dropping rule; and/or the like. In some aspects, such means may include one or more components of UE 120 described in connection with FIG. 2.

In some aspects, base station 110 may include means for determining a scheduling rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP, wherein the scheduling rule indicates whether the first subsequent communication is permitted to start before a start of the second subsequent communication when the first triggering communication starts after a start of the second triggering communication; means for scheduling one or more communications based at least in part on the scheduling rule; and/or the like. In some aspects, such means may include one or more components of base station 110 described in connection with FIG. 2.

As indicated above, FIG. 2 is provided merely as an example. Other examples may differ from what is described with regard to FIG. 2.

Figure 3:
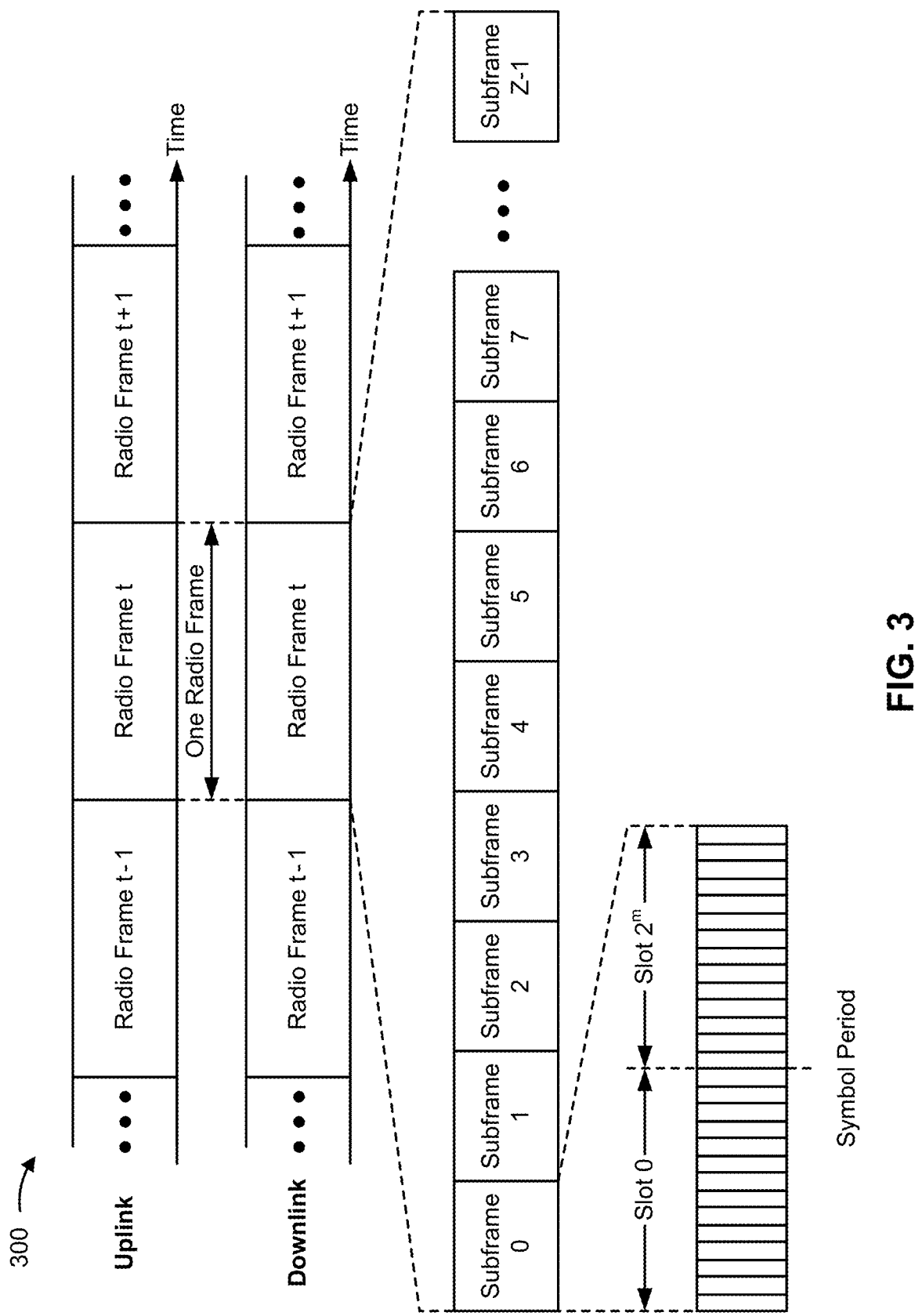
FIG. 3 is a block diagram conceptually illustrating an example of a frame structure in a wireless communication network, in accordance with various aspects of the present disclosure.

FIG. 3 shows an example frame structure 300 in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3, where m is a numerology used for a transmission, such as 0, 1, 2, 3, 4, and/or the like). Each slot may include a set of L symbol periods. For example, each slot may include fourteen symbol periods (e.g., as shown in FIG. 3), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a slot may include one or more mini-slots. A mini-slot may include a number of symbols (e.g., 2 symbols, 3 symbols, 4 symbols, and/or the like) capable of being scheduled as a unit. In some aspects, a scheduling unit may be frame-based, subframe-based, slot-based, mini-slot based, symbol-based, and/or the like.

While some techniques are described herein in connection with frames, subframes, slots, min-slots, and/or the like, these techniques may equally apply to other types of wireless communication structures or transmission time intervals (TTIs), which may be referred to using terms other than "frame," "subframe," "slot," "mini-slot," and/or the like in 5G NR. In some aspects, a wireless communication structure or a TTI may refer to a periodic time-bounded communication unit defined by a wireless communication standard and/or protocol. Additionally, or alternatively, different configurations of wireless communication structures and/or TTIs than those shown in FIG. 3 may be used.

As indicated above, FIG. 3 is provided as an example. Other examples may differ from what is described with regard to FIG. 3.

Figure 4:
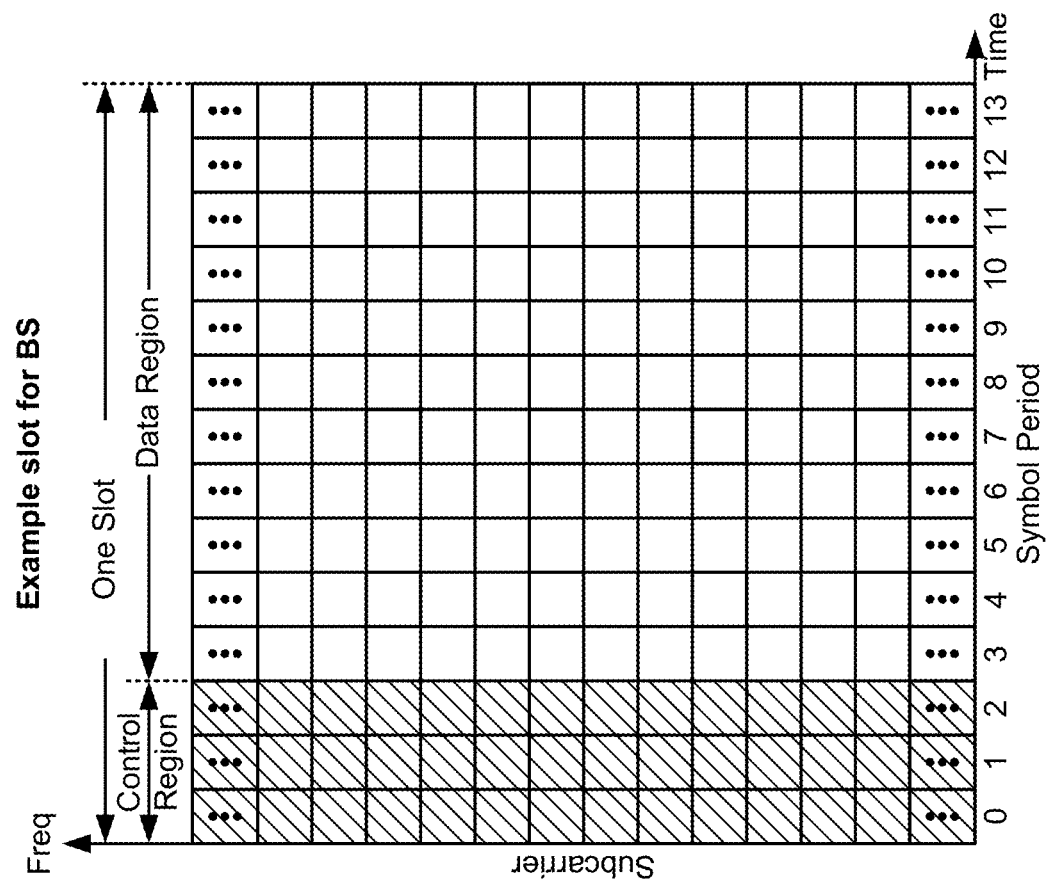
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

Figure 5:
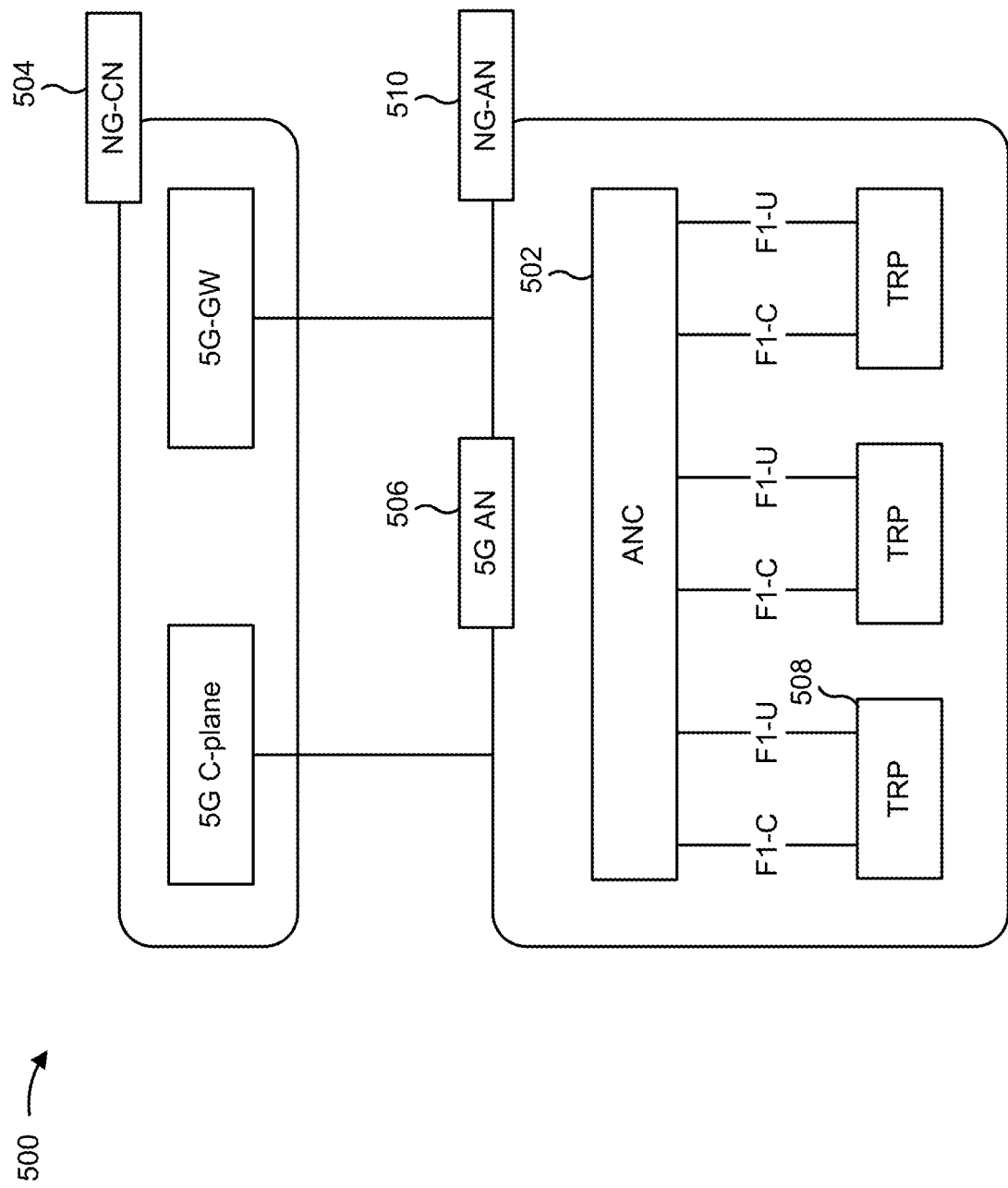
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure.

A 5G access node 506 may include an access node controller (ANC) 502. The ANC 502 may be a central unit (CU) of the distributed RAN 500. The backhaul interface to the next generation core network (NG-CN) 504 may terminate at the ANC 502. The backhaul interface to neighboring next generation access nodes (NG-ANs) may terminate at the ANC 502. The ANC 502 may include one or more TRPs 508 (which may also be referred to as BSs, NR BSs, Node Bs, 5G NBs, APs, gNB, or some other term). As described above, a TRP 508 may be used interchangeably with "cell." In some aspects, multiple TRPs 508 may be included in a single base station 110. Additionally, or alternatively, different TRPs 508 may be included in different base stations 110.

A TRP 508 may be a distributed unit (DU). A TRP 508 may be connected to a single ANC 502 or multiple ANCs 502. For example, for RAN sharing, radio as a service (RaaS), and service specific AND deployments, the TRP 508 may be connected to more than one ANC 502. A TRP 508 may include one or more antenna ports. The TRPs 508 may be configured to individually (e.g., using dynamic selection) or jointly (e.g., using joint transmission) serve traffic to a UE 120.

In some aspects, multiple TRPs 508 may transmit communications (e.g., the same communication or different communications) in the same TTI or different TTIs (e.g., slots, mini-slots, and/or the like) using different spatial parameters (e.g., different quasi co-location (QCL) parameters, different transmission configuration indicator (TCI) states, different precoding parameters, different beamforming parameters, and/or the like).

The local architecture of RAN 500 may be used to illustrate fronthaul definition. The architecture may be defined to support fronthauling solutions across different deployment types. For example, the architecture may be based at least in part on transmit network capabilities (e.g., bandwidth, latency, and/or jitter). The architecture may share features and/or components with LTE. According to aspects, the next generation AN (NG-AN) 510 may support dual connectivity with NR. The NG-AN 510 may share a common fronthaul for LTE and NR. The architecture may enable cooperation between and among TRPs 508. For example, cooperation may be preset within a TRP 508 and/or across TRPs 508 via the ANC 502. In some aspects, no inter-TRP interface may be needed/present.

In some aspects, a dynamic configuration of split logical functions may be present within the architecture of RAN 500. The packet data convergence protocol (PDCP), radio link control (RLC), media access control (MAC) protocol, and/or the like may be adaptably placed at the ANC 502 or TRP 508. According to various aspects, a base station 110 may include a central unit (CU) (e.g., ANC 502) and/or one or more distributed units (e.g., one or more TRPs 508).

As indicated above, FIG. 5 is provided merely as an example. Other examples may differ from what is described with regard to FIG. 5.

Figure 6:
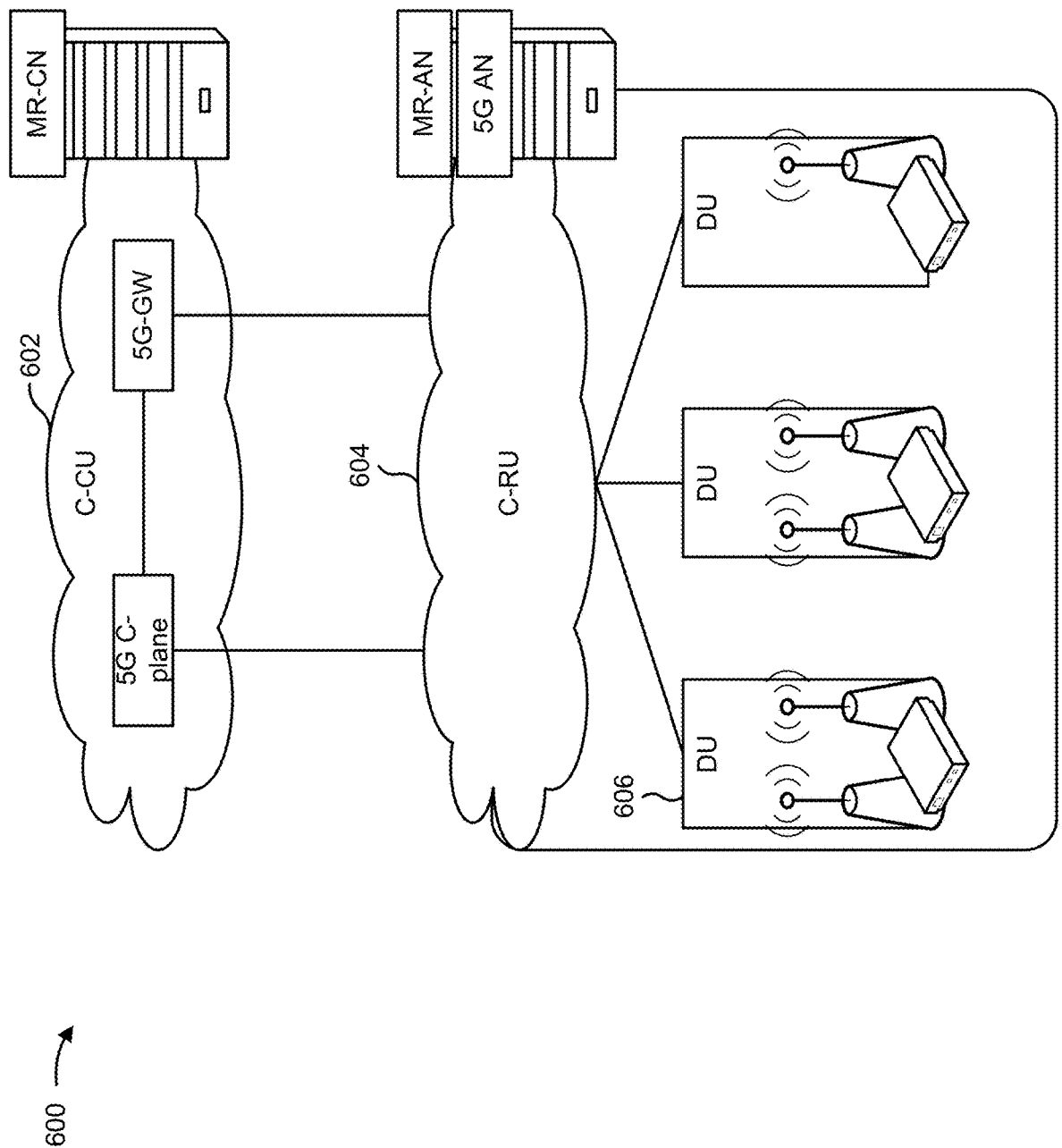
FIG. 6 illustrates an example physical architecture of a distributed RAN, in accordance with various aspects of the present disclosure.

FIG. 6 illustrates an example physical architecture of a distributed RAN 600, according to aspects of the present disclosure.

A centralized core network unit (C-CU) 602 may host core network functions. The C-CU 602 may be centrally deployed. Functionality of the C-CU 602 may be offloaded (e.g., to advanced wireless services (AWS)), in an effort to handle peak capacity. A centralized RAN unit (C-RU) 604 may host one or more ANC functions. In some aspects, the C-RU 604 may host core network functions locally. In some aspects, the C-RU 604 may have distributed deployment. A distributed unit (DU) 606 may host one or more TRPs 508. The DU 406 may be located at edges of the network with radio frequency (RF) functionality.

As indicated above, FIG. 6 is provided merely as an example. Other examples may differ from what is described with regard to FIG. 6.

Figure 7:
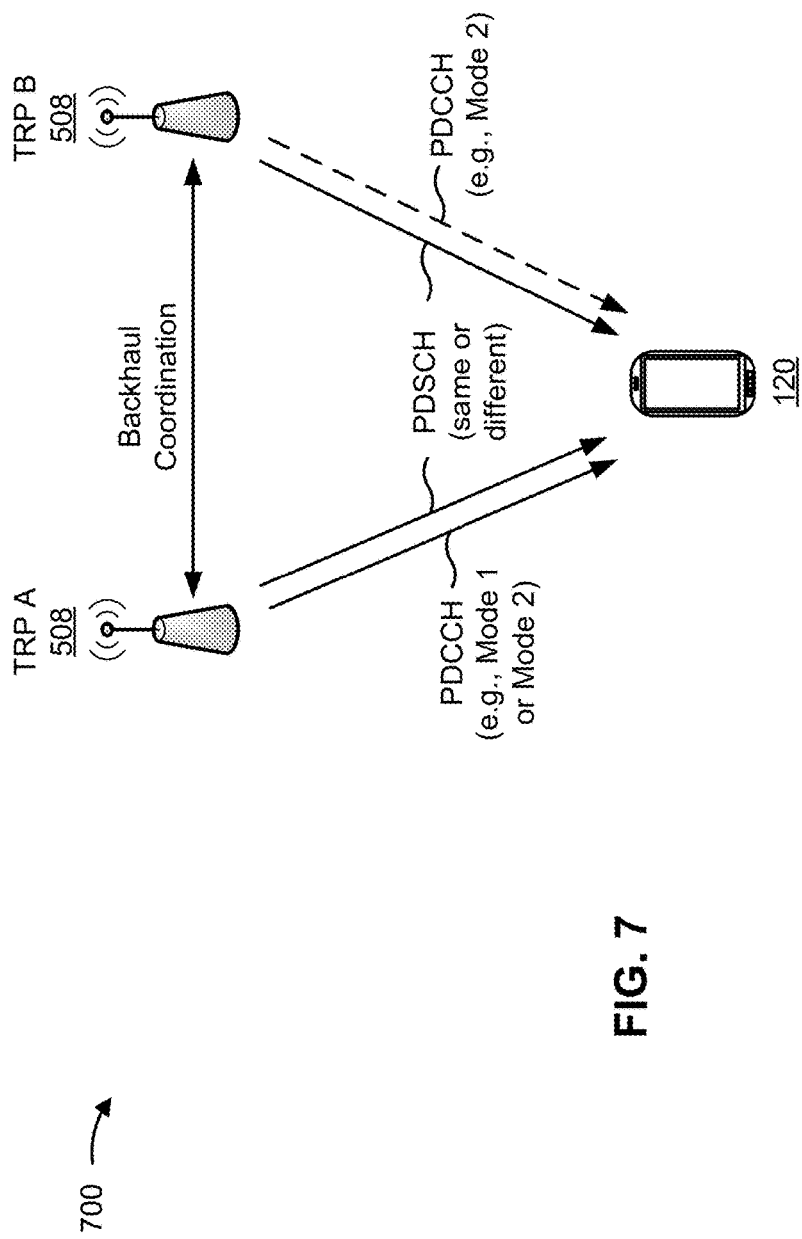
FIG. 7 is a diagram illustrating an example of multi-TRP communication, in accordance with various aspects of the present disclosure.
Figure 7:
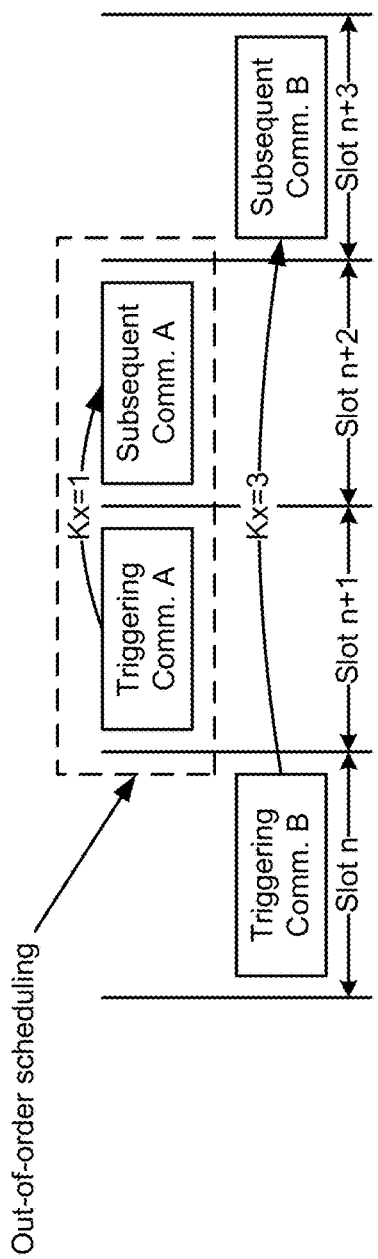

FIG. 7 is a diagram illustrating an example 700 of multi-TRP communication, in accordance with various aspects of the present disclosure.

As shown in FIG. 7, multiple TRPs 508 (shown as TRP A and TRP B) may communicate with the same UE 120 in a coordinated manner (e.g., using coordinated multipoint transmissions and/or the like) to improve reliability, increase throughput, and/or the like. The TRPs 508 may coordinate such communications via a backhaul, which may have a smaller delay and/or higher capacity when the TRPs 508 are co-located at the same base station 110 (e.g., different antenna arrays of the same base station 110), or may have a larger delay and/or lower capacity (as compared to co-location) when the TRPs 508 are located at different base stations 110.

For example, in a first multi-TRP transmission mode (e.g., Mode 1), a single physical downlink control channel (PDCCH) may be used to schedule downlink data communications for a single physical downlink shared channel (PDSCH). In this case, multiple TRPs 508 (e.g., TRP A and TRP B) may transmit communications to the UE 120 on the same PDSCH. In some aspects, different TRPs 508 may transmit in different (e.g., disjoint) sets of resource blocks (RBs) and/or different sets of symbols. Additionally, or alternatively, different TRPs 508 may transmit using different layers (e.g., different multiple input multiple output (MIMO) layers). In some aspects, transmissions on different layers may occur in overlapping resource blocks and/or overlapping symbols (e.g., may overlap in time and/or frequency, may occur in the same resource element or different resource elements, and/or the like). In some aspects, Mode 1 may be used when there is an ideal or small backhaul delay, such as when the TRPs 508 are co-located.

As another example, in a second multi-TRP transmission mode (e.g., Mode 2), multiple PDCCHs may be used to schedule downlink data communications for multiple corresponding PDSCHs (e.g., one PDCCH for each PDSCH). In this case, each PDCCH, from a respective TRP 508, may schedule a downlink data communications for a respective PDSCH transmitted by the respective TRP 508. In some aspects, Mode 2 may be used when there is a non-ideal or large backhaul delay, such as when the TRPs 508 are not co-located.

In Mode 2 and/or another mode where the TRPs 508 are not connected via an ideal backhaul or a backhaul with a small delay for communications between the TRPs 508, the TRPs 508 may be unable to communicate with one another quickly enough to coordinate scheduling operations. In this case, the TRPs 508 may perform independent scheduling (e.g., without using information from another TRP 508 to schedule communications). Because the TRPs 508 do not share scheduling information, this may result in out-of-order scheduling of communications for the UE 120, as described below.

As shown, a first TRP 508 (e.g., TRP A) may transmit a first triggering communication (shown as Triggering Comm. A) that triggers a first timeline for a first subsequent communication (shown as Subsequent Comm. A) of the first TRP 508. For example, the first TRP 508 may transmit a first PDCCH communication that indicates a timeline (e.g., a number of slots and/or the like) between the first PDCCH communication and a subsequent PDSCH communication scheduled by the first PDCCH communication. Similarly, a second TRP 508 (e.g., TRP B) may transmit a second triggering communication (shown as Triggering Comm. B) that triggers a second timeline for a second subsequent communication (shown as Subsequent Comm. B) of the second TRP 508. For example, the second TRP 508 may transmit a second PDCCH communication that indicates a timeline (e.g., a number of slots and/or the like) between the second PDCCH communication and a subsequent PDSCH communication scheduled by the second PDCCH communication.

As shown, out-of-order scheduling may refer to a scenario where the first triggering communication starts after (e.g., in a later slot than, a later symbol than, and/or the like) a start of the second triggering communication, and where the first subsequent communication starts before (e.g., in an earlier slot than, an earlier symbol than, and/or the like) a start of the second subsequent communication. In this case, the communications of TRP A may be scheduled out-of-order from the communications of TRP B. Similarly, out-of-order scheduling may occur when the second triggering communication starts after a start of the first triggering communication, and where the second subsequent communication starts before a start of the first subsequent communication. In this case, the communications of TRP B may be scheduled out-of-order from the communications of TRP A. Additionally, or alternatively, out-of-order scheduling may refer to a scenario where a first triggering communication ends after an end of a second triggering communication, and where a first subsequent communication starts before an end of a second subsequent communication.

In some aspects, the triggering communication may be a PDCCH communication, and the subsequent communication may be a PDSCH communication. The PDCCH communication (e.g., downlink control information (DCI), a downlink grant, and/or the like) may schedule the PDSCH communication by indicating a value of a timeline, such as a K0 value, that indicates a timing (e.g., a number of TTIs, slots, and/or the like) between the PDCCH communication and the PDSCH communication. In FIG. 7, the timeline is shown generically as a Kx value, which could be a K0 value, a K1 value, a K2 value, and/or the like.

In some aspects, the triggering communication may be a PDCCH communication, and the subsequent communication may be a physical uplink shared channel (PUSCH) communication. The PDCCH communication (e.g., DCI, an uplink grant, and/or the like) may schedule the PUSCH communication by indicating a value of a timeline, such as a K2 value, that indicates a timing (e.g., a number of TTIs, slots, and/or the like) between the PDCCH communication and the PUSCH communication.

In some aspects, the triggering communication may be a PDSCH communication, and the subsequent communication may be a hybrid automatic repeat request (HARQ) acknowledgement (ACK) communication (e.g., an ACK, a negative acknowledgment (NACK), a HARQ codebook, and/or the like). The HARQ ACK communication may correspond to the PDSCH communication. For example, the HARQ ACK communication may include ACK or NACK (ACK/NACK) feedback for the PDSCH communication, and may be transmitted by the UE 120 to ACK or NACK the PDSCH communication. In some aspects, a PDCCH communication, that schedules the PDSCH communication, may indicate a value of a timeline, such as a K1 value, that indicates a timing (e.g., a number of TTIs, slots, and/or the like) between the PDSCH communication and the HARQ ACK communication.

In New Radio, out-of-order scheduling is not supported (e.g., for a first triggering communication and first subsequent communication associated with a first HARQ process identifier and a second triggering communication and second subsequent communication associated with a second HARQ process identifier). For example, out-of-order scheduling where the triggering communication is a PDCCH communication and the subsequent communication is a PDSCH communication, scheduled by the PDCCH communication, is not supported within a cell. In this case, when a UE is scheduled to start receiving a first PDSCH communication starting in symbol j by a PDCCH communication ending in symbol i, the UE may not be scheduled to receive a PDSCH communication starting earlier than the end of a first PDSCH communication with a PDCCH communication that ends later than symbol i.

As another example, out-of-order scheduling where the triggering communication is a PDCCH communication and the subsequent communication is a PUSCH communication, scheduled by the PDCCH communication, is not supported within a cell. For example, when a UE is scheduled to start a first PUSCH communication in symbol j by a PDCCH communication ending in symbol i, the UE may not be scheduled to transmit a PUSCH communication starting earlier than the end of the first PUSCH communication scheduled by a PDCCH communication that ends later than symbol i. As another example, out-of-order scheduling where the triggering communication is a PDSCH communication and the subsequent communication is a HARQ ACK communication (sometimes also referred to as a HARQ-ACK communication, ACK/NACK feedback, ACK/NACK information, and/or the like), corresponding to the PDSCH communication, is not supported within a cell or across cells. For example, a UE may not receive a first PDSCH communication in slot i, with a corresponding HARQ ACK communication assigned to be transmitted in slot j, and a second PDSCH communication starting later than the first PDSCH communication with a corresponding HARQ ACK communication assigned to be transmitted in a slot before slot j.

However, in multi-TRP communications where the TRPs 508 perform independent scheduling, out-of-order scheduling may occur because the TRPs 508 do not share scheduling information that could otherwise be used to avoid out-of-order scheduling. Some techniques and apparatuses described herein address this scenario using various scheduling rules, some of which permit out-of-order scheduling across TRPs 508, and some of which do not permit out-of-order scheduling across TRPs 508. In either case, the scheduling rule may be applied consistently across TRPs 508 communicating with a UE 120 using multi-TRP communication, thereby reducing scheduling errors, reducing transmission errors (and thus conserving network resources and resources of the TRPs 508 and UE 120), and/or the like. Furthermore, in the case where the scheduling rule is violated, some techniques and apparatus described herein provide a dropping rule to be used by the UE 120 to determine which communication(s) to drop. Additional details are described below.

As indicated above, FIG. 7 is provided as an example. Other examples may differ from what is described with respect to FIG. 7.

Figure 8:
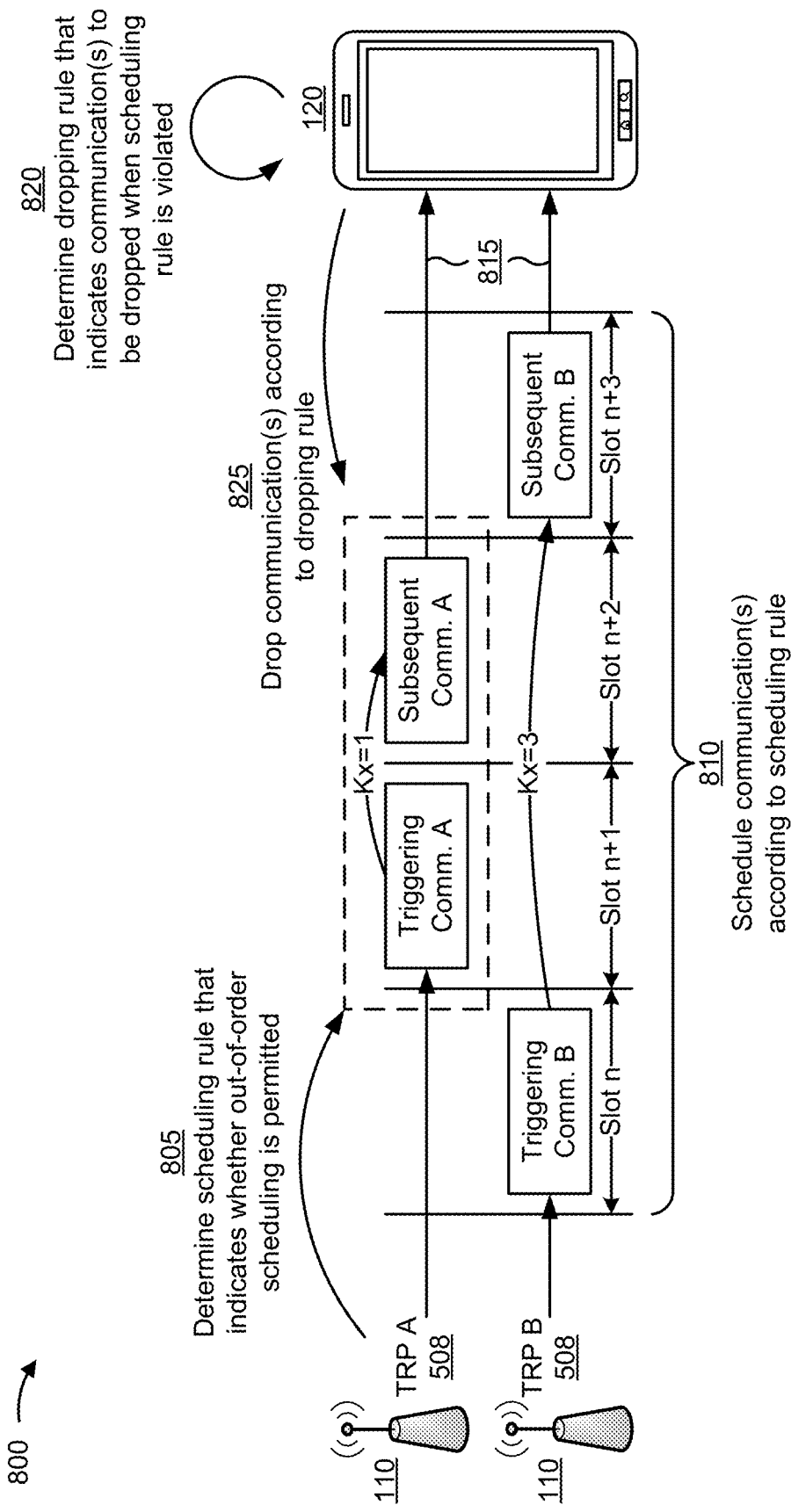
FIGS. 8-13 are diagrams illustrating examples of scheduling timelines for multi-TRP operations, in accordance with various aspects of the present disclosure.

FIG. 8 is a diagram illustrating an example 800 of scheduling timelines for multi-TRP operations, in accordance with various aspects of the present disclosure.

As shown in FIG. 8, multiple TRPs 508 (shown as TRP A and TRP B) may communicate with a UE 120. In some aspects, the multiple TRPs 508 may be included in a single base station 110. In some aspects, different TRPs 508, of the multiple TRPs 508, may be included in different base stations 110. For example, TRP A may be included in a first base station 110, and TRP B may be included in a second base station 110. In some aspects, different TRPs 508, of the multiple TRPs 508, may not be co-located, may operate using a second multi-TRP transmission mode (Mode 2), may have a non-ideal backhaul, may have a backhaul with a large delay or latency (e.g., that satisfies a threshold), and/or the like. Additionally, or alternatively, different TRPs 508, of the multiple TRPs 508, may perform independent scheduling of communications (e.g., without receiving scheduling information from the other TRP(s) 508).

In FIG. 8, two TRPs 508 are shown as communicating with the UE 120. However, in some aspects, a different number of TRPs 508 (e.g., three TRPs 508, four TRPs 508, and/or the like) may communicate with the UE 120 in a multi-TRP mode, sometimes referred to as a multi-panel mode. Some operations are described herein as being performed by a base station 110. Such operations may be performed by a single TRP 508 included in the base station 110 or by multiple TRPs 508 included in the base station 110.

As shown by reference number 805, the base station 110 may determine a scheduling rule that indicates whether out-of-order scheduling is permitted. As described above in connection with FIG. 7, out-of-order scheduling may refer to a scenario where a first triggering communication (shown as Triggering Comm. A) starts after a start of a second triggering communication (shown as Triggering Comm. B), and where a first subsequent communication (shown as Subsequent Comm. A) starts before a start of a second subsequent communication (shown as Subsequent Comm. B). Additionally, or alternatively, out-of-order scheduling may refer to a scenario where a first triggering communication ends after an end of a second triggering communication, and where a first subsequent communication starts before an end of a second subsequent communication. Thus, the scheduling rule may indicate whether the first subsequent communication is permitted to start before a start of the second subsequent communication when the first triggering communication starts after a start of the second triggering communication. In other words, the scheduling rule may indicate whether the first triggering communication is permitted to start after a start of the second triggering communication when the first triggering communication triggers a first subsequent communication scheduled to start before a start of the second subsequent communication. Similarly, the scheduling rule may indicate whether a first subsequent communication is allowed to start before an end of a second subsequent communication, where a first triggering communication ends after an end of a second triggering communication.

The above example of out-of-order scheduling is used for explanatory purposes in FIG. 8. However, out-of-order scheduling may also refer to a scenario where the second triggering communication starts after a start of the first triggering communication, and where the second subsequent communication starts before a start of the first subsequent communication. In this case, the scheduling rule may indicate whether the second subsequent communication is permitted to start before a start of the first subsequent communication when the second triggering communication starts after a start of the first triggering communication. In other words, the scheduling rule may indicate whether the second triggering communication is permitted to start after a start of the first triggering communication when the second triggering communication triggers a second subsequent communication scheduled to start before a start of the first subsequent communication. Similarly, out-of-order scheduling may refer to a scenario where a first triggering communication ends after an end of a second triggering communication, and where a first subsequent communication starts before an end of a second subsequent communication. In this case, the scheduling rule may indicate whether a first subsequent communication is allowed to start before an end of a second subsequent communication, where a first triggering communication ends after an end of a second triggering communication.

In some aspects, the first triggering communication and the first subsequent communication are associated with a first HARQ process identifier, and the second triggering communication and the second subsequent communication are associated with a second HARQ process identifier. Thus, the scheduling rule may apply to communications having different HARQ process identifiers across the multiple TRPs 508. In other words, in some aspects, the scheduling rule may not apply to retransmissions (e.g., different communications having the same HARQ process identifier).

As described above in connection with FIG. 7, in some aspects, the triggering communication may be a PDCCH communication, and the subsequent communication may be a PDSCH communication scheduled by the PDCCH communication (e.g., according to a timeline indicated by a K0 value). Alternatively, the triggering communication may be a PDCCH communication, and the subsequent communication may be a PUSCH communication scheduled by the PDCCH communication (e.g., according to a timeline indicated by a K2 value). Alternatively, the triggering communication may be a PDSCH communication, and the subsequent communication may be a HARQ ACK communication corresponding to the PDSCH communication (e.g., that occurs according to a timeline indicated by a K1 value).

In some aspects, TRPs 508 may be associated with a particular channel in accordance with an association rule. For example, a radio resource control (RRC) parameter may associate a CORESET with an index value (e.g., a CORESET pool index value of 0 or 1 to associate the particular channel with a first TRP 508 or a second TRP 508). Additionally, or alternatively, a scheduling downlink control information (DCI) may associate a PDSCH, PUSCH, PUCCH (e.g., for HARQ ACK feedback), and/or the like with a TRP 508. For example, a TRP 508 may receive a PDCCH scheduling a PDSCH communication (or activating a PDSCH communication for semi-persistent scheduling (SPS)) on a CORESET configured with a particular index value to indicate a particular TRP 508. In this case, the particular index value may indicate that a PUCCH conveying a HARQ ACK communication for the PDSCH communication is associated with the particular TRP 508.

In some aspects, the scheduling rule may apply to communications of the same type (e.g., a same type of triggering communication and a same type of subsequent communication). For example, a first triggering PDCCH communication and a first subsequent PDSCH communication associated with a first TRP may or may not be permitted (e.g., depending on the scheduling rule) to be out-of-order with respect to a second triggering PDCCH communication and a second subsequent PDSCH communication associated with a second TRP. As another example, a first triggering PDCCH communication and a first subsequent PUSCH communication associated with a first TRP may or may not be permitted to be out-of-order with respect to a second triggering PDCCH communication and a second subsequent PUSCH communication associated with a second TRP. As another example, a first triggering PDSCH communication and a first subsequent HARQ ACK communication associated with a first TRP may or may not be permitted to be out-of-order with respect to a second triggering PDSCH communication and a second subsequent HARQ ACK communication associated with a second TRP. Thus, the first triggering communication and the second triggering communication may be a same first type of communication (e.g., both may be a PDCCH communication or both may be a PDSCH communication), and the first subsequent communication and the second subsequent communication may be a same second type of communication (e.g., both may be a PDSCH communication, both may be a PUSCH communication, or both may be a HARQ ACK communication).

In some aspects, the base station 110 may determine the scheduling rule by retrieving the scheduling rule from memory of the base station 110. In some aspects, the scheduling rule may be prespecified (e.g., according to a wireless communication standard), and may be stored and/or hard coded in memory of the base station 110. Additionally, or alternatively, the scheduling rule may be preconfigured and stored in memory of the base station 110. For example, the scheduling rule may be selected from a set of possible scheduling rules (e.g., according to a capability of the base station 110 and/or the UE 120). In this case, the scheduling rule may be indicated to the UE 120 and/or one or more TRPs 508.

As shown by reference number 810, the base station 110 may schedule one or more communications based at least in part on the scheduling rule. For example, the base station 110 may schedule one or more triggering communications and/or one or more subsequent communications such that the scheduling rule is not violated.

In some aspects, the scheduling rule may indicate that out-of-order scheduling is not permitted across TRPs 508. In this case, the base station 110 may schedule the one or more communications such that out-of-order scheduling does not occur. For example, the TRPs 508 may use the same timeline for communications of the same type (e.g., for a same type of triggering communication and a same type of subsequent communication). For example, the TRPs 508 may use the same K0 value, the same K1 value, the same K2 value, and/or the like. In some aspects, the TRPs 508 may exchange this value, may negotiate this value, and/or the like. Additionally, or alternatively, one or more of the TRPs 508 may indicate this value to the UE 120. Additional details regarding this type of scheduling rule are described below in connection with FIGS. 9 and 12.

In some aspects, the scheduling rule may indicate that out-of-order scheduling is permitted across TRPs 508. Additionally, or alternatively, the scheduling rule may indicate that out-of-order scheduling is not permitted for communications of a single TRP 508. In this case, the base station 110 may schedule the one or more communications without regard to whether out-of-order scheduling occurs across TRPs 508 (e.g., but still ensuring that out-of-order scheduling does not occur for communications of a single TRP 508). In this case, the TRPs 508 may use different timelines for communications of the same type (e.g., for a same type of triggering communication and a same type of subsequent communication). For example, the TRPs 508 may use different K0 values, different K1 values, different K2 values, and/or the like. In some aspects, the TRPs 508 may indicate respective values to the UE 120. In some aspects, the UEs 120 may not expect to receive out-of-order scheduling when out-of-order scheduling is not permitted (e.g., as a result of an error). In this case, if a UE 120 detects an out-of-order scheduled communication, the UE 120 may perform one or more response actions, such as dropping the out-of-order scheduled communication, storing the out-of-order scheduled communication, and/or the like. Additional details regarding this type of scheduling rule are described below in connection with FIG. 11.

In some aspects, a scheduling rule may be specific to a carrier. For example, a first triggering communication and a first subsequent communication may or may not be permitted (e.g., depending on the scheduling rule) to be out-of-order with respect to a second triggering communication and a second subsequent communication scheduled and/or transmitted on the same carrier as the first triggering communication and the first subsequent communication.

In some aspects, a scheduling rule may apply across carriers. For example, a first triggering communication and a first subsequent communication may or may not be permitted (e.g., depending on the scheduling rule) to be out-of-order with respect to a second triggering communication and a second subsequent communication scheduled and/or transmitted on any carrier (e.g., regardless of whether the second triggering communication and the second subsequent communication are scheduled and/or transmitted on the same carrier as the first triggering communication and the first subsequent communication). In some aspects (e.g., in cross-carrier scheduling), a triggering communication and a subsequent communication may be on different carriers.

In some aspects, a scheduling rule may depend on a timeline for a communication. For example, when a timeline value (e.g., K0, K1, K2, and/or the like) is large (e.g., greater than or equal to a threshold) for the first TRP, then out-of-order scheduling may be permitted for the second TRP because the UE 120 may have sufficient time to process out-of-order communications from the second TRP in this case. Conversely, when a timeline value is small (e.g., greater than or equal to a threshold) for the first TRP, then out-of-order scheduling may not be permitted for the second TRP because the UE 120 may not have sufficient time to process out-of-order communications from the second TRP in this case.

As shown by reference number 815, the base station 110 may transmit, and the UE 120 may receive, the first triggering communication, the first subsequent communication, the second triggering communication, and/or the second subsequent communication. For example, the first TRP 508 (e.g., TRP A) may transmit, to the UE 120, the first triggering communication and the first subsequent communication. Similarly, the second TRP 508 (e.g., TRP B) may transmit, to the UE 120, the second triggering communication and the second subsequent communication. In some aspects, these communications may be scheduled and/or transmitted so as to avoid violating a scheduling rule. However, if the scheduling rule is violated (e.g., due to a scheduling error and/or the like), the UE 120 may apply a dropping rule to drop one or more of the communications, as described below.

As shown by reference number 820, the UE 120 may determine a dropping rule. The dropping rule may indicate one or more communications to be dropped when the scheduling rule is violated. For example, the dropping rule may indicate whether to drop the first triggering communication, the first subsequent communication, the second triggering communication, and/or the second subsequent communication. For a downlink communication, the UE 120 may drop the communication by refraining from monitoring for the communication, refraining from decoding the communication, refraining from processing the communication (e.g., after decoding), and/or the like. For an uplink communication, the UE 120 may drop the communication by refraining from transmitting the communication, refraining from encoding the communication, refraining from processing the communication for transmission, and/or the like.

In some aspects, the dropping rule may indicate to drop a pair of communications, such as a triggering communication and a subsequent communication. However, in some aspects, the UE 120 may need to receive and decode the triggering communication to determine that the scheduling rule has been violated. In this case, once the UE 120 determines that the scheduling rule has been violated, the UE 120 may refrain from further processing of the triggering communication, and may drop the subsequent communication. In this way, resources of the UE 120 (e.g., memory resources, processing resources, battery power, and/or the like) may be conserved.

In some aspects, the UE 120 may determine the dropping rule by retrieving the dropping rule from memory of the UE 120. In some aspects, the dropping rule may be prespecified (e.g., according to a wireless communication standard), and may be stored and/or hard coded in memory of the UE 120. Additionally, or alternatively, the dropping rule may be preconfigured and stored in memory of the UE 120. For example, the dropping rule may be selected from a set of possible dropping rules (e.g., according to a capability of the base station 110 and/or the UE 120). In this case, the dropping rule may be indicated to the UE 120 and/or to one or more TRPs 508. In some aspects, the UE 120 may determine the dropping rule after determining that the scheduling rule has been violated. In this case, the UE 120 may store the scheduling rule in memory. In some aspects, the scheduling rule may be prespecified and/or preconfigured, as described above.

In some aspects, the dropping rule may indicate that a later-occurring communication is to be dropped. For example, the dropping rule may indicate that a later-occurring triggering communication is to be dropped (e.g., the later-occurring communication of the first triggering communication or the second triggering communication). Additionally, or alternatively, the dropping rule may indicate that a later-occurring subsequent communication is to be dropped (e.g., a later-occurring communication of the first subsequent communication or the second subsequent communication). In some aspects, the dropping rule may indicate that a later-occurring triggering communication and/or a corresponding subsequent communication (e.g., which would be an earlier-occurring subsequent communication in an out-of-order scheduling scenario) is to be dropped. In this way, the UE 120 may conserve resources by avoiding unnecessary processing of communications when a scheduling rule is violated (e.g., which may correspond to a UE capability being violated).

In some aspects, the dropping rule may indicate that an earlier-occurring communication is to be dropped. For example, the dropping rule may indicate that an earlier-occurring triggering communication is to be dropped (e.g., the earlier-occurring communication of the first triggering communication or the second triggering communication). Additionally, or alternatively, the dropping rule may indicate that an earlier-occurring subsequent communication is to be dropped (e.g., an earlier-occurring communication of the first subsequent communication or the second subsequent communication). In some aspects, the dropping rule may indicate that an earlier-occurring triggering communication and/or a corresponding subsequent communication (e.g., which would be a later-occurring subsequent communication in an out-of-order scheduling scenario) is to be dropped. In this way, the UE 120 may conserve resources by avoiding unnecessary processing of communications when a scheduling rule is violated (e.g., which may correspond to a UE capability being violated).

In some aspects, the dropping rule may be based at least in part on a TRP identifier. For example, the dropping rule may indicate that one or more communications from a TRP with a lower (e.g., the lowest) TRP identifier, of the multiple TRPs communicating with the UE 120, are to be dropped. Alternatively, the dropping rule may indicate that one or more communications from a TRP with a higher (e.g., the highest) TRP identifier, of the multiple TRPs communicating with the UE 120, are to be dropped.

Additionally, or alternatively, the dropping rule may be based on a relationship between the TRPs 508 communicating with the UE 120 in the multi-TRP mode. For example, if two or more of the TRPs 508 have a master-slave relationship (e.g., one of the TRPs 508 is a master TRP and one of the TRPs 508 is a slave TRP), then the dropping rule may indicate that one or more communications from the slave TRP are to be dropped.

Additionally, or alternatively, the dropping rule may be based at least in part on a quasi co-location (QCL) relationship associated with a communication. For example, the dropping rule may indicate that a triggering communication and/or a subsequent communication having a QCL relationships that satisfies a condition (e.g., with respect to the other triggering communications and/or the other subsequent communications) is to be dropped. For example, a communication having a lower or lowest QCL relationship value may be dropped. Alternatively, a communication having a higher or highest QCL relationship value may be dropped. Additionally, or alternatively, a communication having a default QCL relationship value (e.g., a prespecified QCL relationship value, a preconfigured QCL relationship value, and/or the like) may be dropped. The QCL relationship value may include, for example, a transmission configuration indicator (TCI) state value, a spatial relation value, a spatial domain filter value, a beam index, and/or the like.

Additionally, or alternatively, the dropping rule may be based at least in part on a control resource set (CORESET) identifier associated with a communication. For example, the dropping rule may indicate that a triggering communication and/or a subsequent communication associated with a CORESET identifier that satisfies a condition (e.g., with respect to the other triggering communications and/or the other subsequent communications) is to be dropped. For example, a communication having a lower or lowest CORESET identifier may be dropped. Alternatively, a communication having a higher or highest CORESET identifier may be dropped. Additionally, or alternatively, a communication having a default CORESET identifier (e.g., a prespecified CORESET identifier, a preconfigured CORESET identifier, and/or the like) may be dropped.

Additionally, or alternatively, the dropping rule may be based at least in part on a signal quality associated with a communication. For example, the dropping rule may indicate that a triggering communication and/or a subsequent communication associated with a signal quality that satisfies a condition (e.g., with respect to the other triggering communications and/or the other subsequent communications) is to be dropped. For example, a communication having a lower or lowest signal quality may be dropped. In some aspects, the signal quality may be indicated by a signal quality parameter, such as a reference signal received power (RSRP) parameter, a reference signal received quality (RSRQ) parameter, a signal to interference plus noise ratio (SINR) parameter, and/or the like. In some aspects, the UE 120 may measure the signal quality using one or more demodulation reference signal (DMRSs) (e.g., on the triggering communication and/or the subsequent communication), using one or more channel state information reference signal (CSI-RSs), and/or the like.

Additionally, or alternatively, the dropping rule may be based at least in part on a carrier associated with a communication. For example, the dropping rule may indicate that a triggering communication and/or a subsequent communication associated with a carrier that satisfies a condition (e.g., with respect to the other triggering communications and/or the other subsequent communications) is to be dropped. For example, a communication carried on a carrier having a lower or lowest carrier index may be dropped. Alternatively, a communication carried on a carrier having a higher or highest carrier index may be dropped. Additionally, or alternatively, a communication carried on a default carrier may be dropped (e.g., a prespecified carrier, a preconfigured carrier, and/or the like) may be dropped. For example, a communication carried on a carrier having a default index, a carrier that is a secondary carrier (e.g., as opposed to a primary carrier), and/or the like, may be dropped.

Additionally, or alternatively, the dropping rule may be based at least in part on the timelines associated with respective pairs of communications. For example, the UE 120 may drop a communication associated with a shorter timeline. Alternatively, the UE 120 may drop a communication associated with a longer timeline.

As shown by reference number 825, the UE 120 may drop the one or more communications based at least in part on the dropping rule. In some aspects, the UE 120 may drop a pair of corresponding communications, such as a triggering communication and a subsequent communication that corresponds to the triggering communication. In some aspects, the UE 120 may drop a single communication from a pair of corresponding communications, such as the subsequent communication (e.g., because the UE 120 may need to read the triggering communication to determine that the scheduling rule has been violated). The UE 120 may identify the one or more communications to be dropped based at least in part on a dropping rule, as described above.

In some aspects, a dropping rule may be specific to a carrier. For example, the dropping rule may indicate one or more communications to be dropped when the first triggering communication and the second triggering communication are on a same carrier. Additionally, or alternatively, the dropping rule may indicate one or more communications to be dropped when the first subsequent communication and the second subsequent communication are on a same carrier. Additionally, or alternatively, the dropping rule may indicate one or more communications to be dropped when the first triggering communication, the second triggering communication, the first subsequent communication, and the second subsequent communication are on a same carrier.

In some aspects, a dropping rule may apply across carriers. For example, the dropping rule may indicate one or more communications to be dropped when the first triggering communication and the second triggering communication are on different carriers. Additionally, or alternatively, the dropping rule may indicate one or more communications to be dropped when the first subsequent communication and the second subsequent communication are on different carriers. Additionally, or alternatively, the dropping rule may indicate one or more communications to be dropped when some combination (e.g., a specific combination) of the first triggering communication, the second triggering communication, the first subsequent communication, and the second subsequent communication are on different carriers.

In some aspects, a carrier may be dynamically activated or deactivated for a TRP, such as by an indication in a media access control (MAC) control element (CE) (MAC-CE), a radio resource control (RRC) message, and/or the like. This may lead to ambiguities and/or inconsistencies between HARQ ACK feedback transmitted by the UE 120 (or the base station 110) and HARQ ACK feedback expected by the base station 110 (or the UE 120). To resolve such ambiguities, a size of HARQ ACK codebook may not be changed until after a time period (e.g., a delay, a timer expiration, a number of TTIs, a number of slots, and/or the like) has elapsed from when the carrier is activated or deactivated. In some aspects, the length of the time period may permit the TRPs 508 to communicate with one another via a non-ideal backhaul. For example, the time period may be greater than 3 milliseconds, may be greater than or equal to 5 milliseconds, may be greater than or equal to 10 milliseconds, may be greater than or equal to 20 milliseconds, and/or the like.

Additionally, or alternatively, a HARQ ACK codebook rule may be determined by the UE 120 and/or the base station 110 after a carrier is activated or deactivated (e.g., after 3 milliseconds from a MAC-CE command, and/or the like). The HARQ ACK codebook rule may be prespecified, may be preconfigured, may be indicated to the UE 120 by a base station 110, and/or the like. In some aspects, the HARQ ACK codebook rule may indicate that the UE 120 is to transmit a NACK for a deactivated carrier.

Additionally, or alternatively, the HARQ ACK codebook rule may indicate that the UE 120 is to bundle ACK or NACK (ACK/NACK) feedback, for an activated carrier, with a default carrier (e.g., a primary carrier, a carrier having a default index, a carrier having the lowest index or identifier other than the activated carrier, a carrier having the highest index or identifier other than the activated carrier, a scheduled carrier having the lowest index or identifier, a scheduled carrier having the highest index or identifier, and/or the like). For example, the UE 120 may perform an AND operation for the ACK or NACK for the activated carrier and for the ACK or NACK for the default carrier. If ACK/NACK feedback does not apply for the default carrier (e.g., because the default carrier was not scheduled with a communication), then the ACK or NACK for the activated carrier may be transmitted in the bitfield (e.g., one or more bits) for the default carrier (e.g., similar to an OR operation). In this way, the UE 120 and the TRPs 508 may reduce ambiguities in interpretation of HARQ ACK feedback.

As indicated above, FIG. 8 is provided as an example. Other examples may differ from what is described with respect to FIG. 8.

Figure 9:
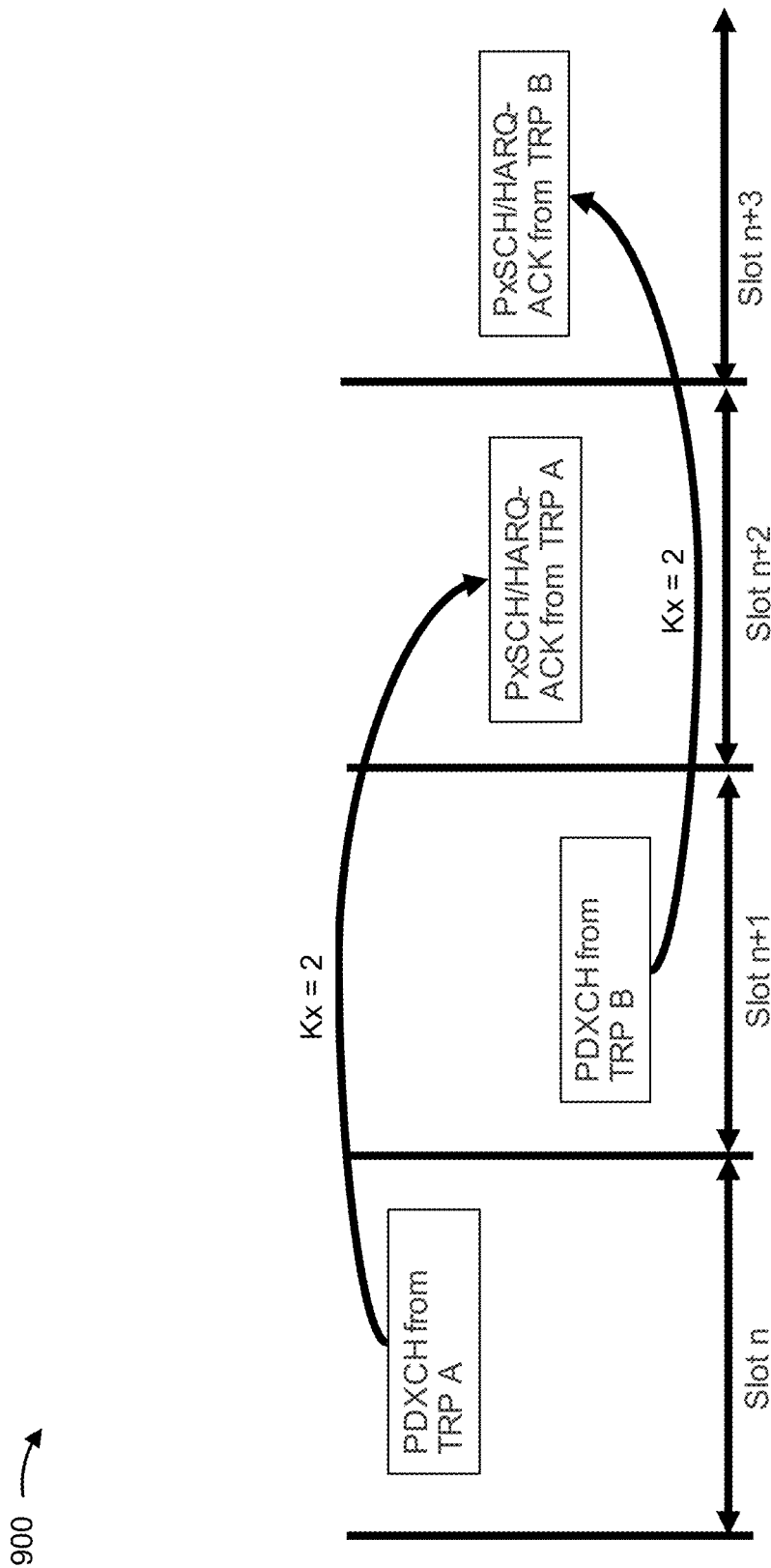

FIG. 9 is a diagram illustrating an example 900 of scheduling timelines for multi-TRP operations, in accordance with various aspects of the present disclosure.

FIG. 9 shows an example where the scheduling rule indicates that out-of-order scheduling is not permitted across TRPs 508 (e.g., for any communications). In this case, the TRPs 508 may use the same timeline for communications of the same type (e.g., for a same type of triggering communication and a same type of subsequent communication). For example, the TRPs 508 are shown as both using a value of 2 for Kx (e.g., which generically represents K0, K1, K2, and/or the like).

In FIG. 9 and other Figures described herein, "PDXCH" may be used to represent PDCCH or PDSCH. Similarly, "PxSCH" may be used to represent PDSCH or PUSCH. In some aspects, the TRPs 508 may use a same first timeline for a triggering PDCCH communication and a subsequent PDSCH communication, may use a same second timeline for a triggering PDCCH communication and a subsequent PUSCH communication, and may use a same third timeline for a triggering PDSCH communication and a subsequent HARQ ACK communication. In some aspects, the first timeline, the second timeline, and the third timeline may be the same. In some aspects, one or more of the first timeline, the second timeline, or the third timeline may be different.

In some aspects, the TRPs 508 may exchange a value for the timeline, may negotiate a value for the timeline, and/or the like. Additionally, or alternatively, one or more of the TRPs 508 may indicate the value of the timeline to the UE 120. In some aspects, to conserve network resources, a single TRP 508 may indicate the value of the timeline to the UE 120, rather than both TRPs 508. In some aspects, the UE 120 may receive an indication that the same timeline value (s) are to be used for multiple TRPs in the multi-TRP mode. In this way, network resources may be conserved.

As indicated above, FIG. 9 is provided as an example. Other examples may differ from what is described with respect to FIG. 9.

Figure 10:
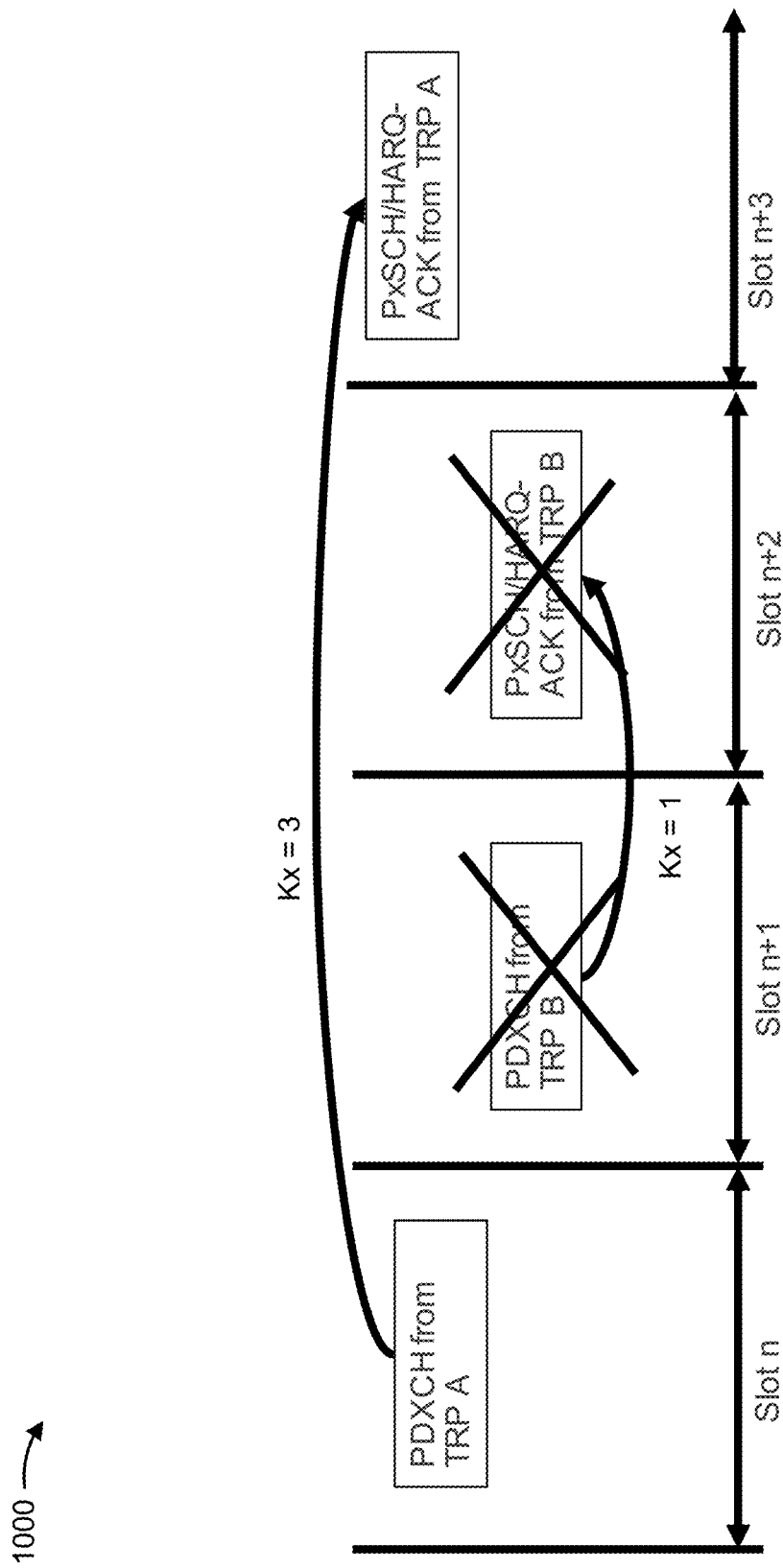

FIG. 10 is a diagram illustrating an example 1000 of scheduling timelines for multi-TRP operations, in accordance with various aspects of the present disclosure.

FIG. 10 shows an example where the scheduling rule indicates that out-of-order scheduling is not permitted across TRPs 508, and the dropping rule indicates, for example, that a later-received triggering communication is to be dropped when the scheduling rule is violated. Thus, as shown, the UE 120 receives and processes a triggering and subsequent communication from TRP A, and drops a triggering and/or subsequent communication from TRP B. In some aspects, the UE 120 may determine that the scheduling rule has been violated because the Kx values for different pairs of communications do not match. Although FIG. 10 is described in connection with a dropping rule that a later-received triggering communication is to be dropped, another dropping rule may be used, as described elsewhere herein.

As indicated above, FIG. 10 is provided as an example. Other examples may differ from what is described with respect to FIG. 10.

Figure 11:
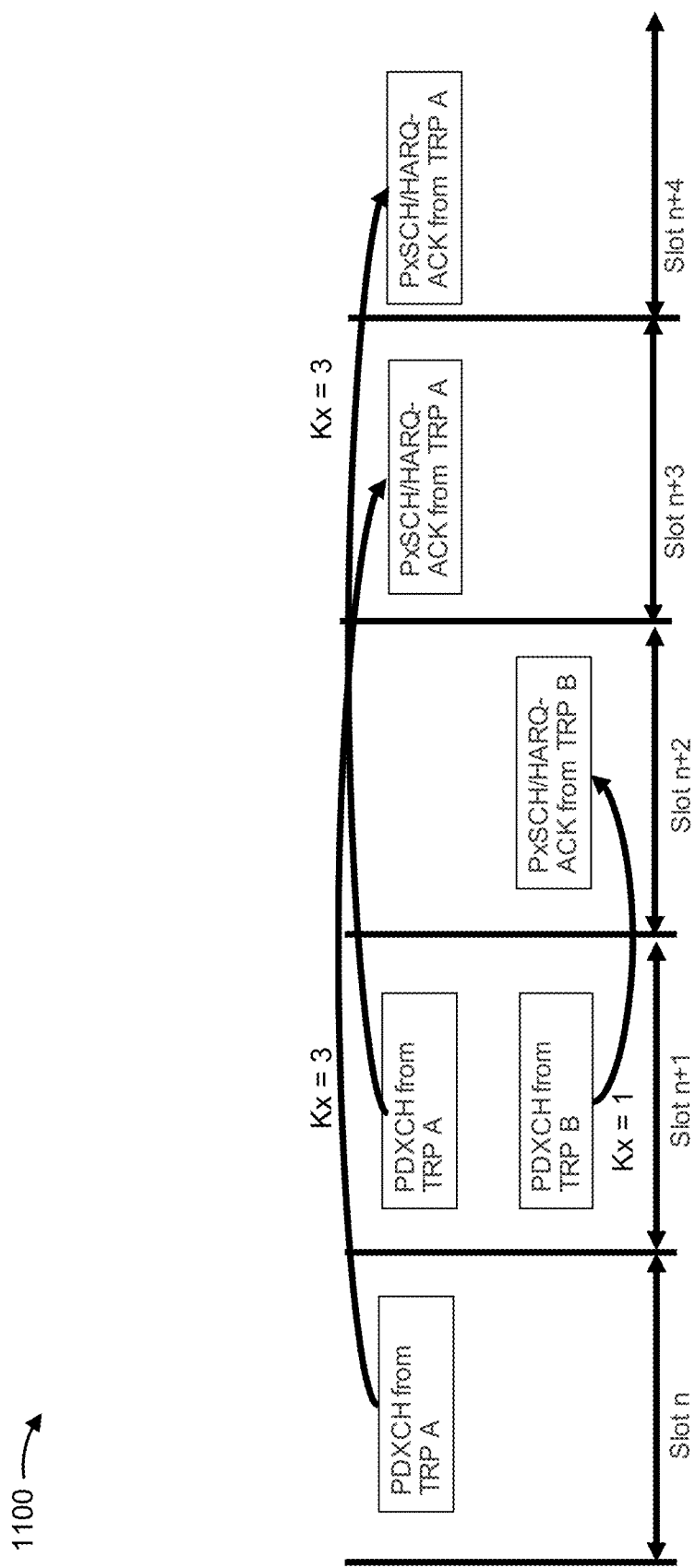

FIG. 11 is a diagram illustrating an example 1100 of scheduling timelines for multi-TRP operations, in accordance with various aspects of the present disclosure.

FIG. 11 shows an example where the scheduling rule indicates that out-of-order scheduling is permitted across TRPs 508. In this case, the TRPs 508 may use different timelines for communications of the same type (e.g., for a same type of triggering communication and a same type of subsequent communication). For example, TRP A is shown as using a value of 3 for Kx (e.g., which generically represents K0, K1, K2, and/or the like), and TRP B is shown as using a value of 1 for the same Kx. In some aspects, both values of the timeline may be indicated to the UE 120 (e.g., by one or more TRPs 508). For example, TRP A may indicate timelines associated with TRP A, and TRP B may indicate timelines associated with TRP B.

In some aspects, the scheduling rule may indicate that out-of-order scheduling is not permitted for communications of a single TRP 508. In this case, TRP A, for example, may ensure that communications of TRP A are not out-of-order, as shown. In this way, the TRPs 508 may ensure that the scheduling rule is not violated.

As indicated above, FIG. 11 is provided as an example. Other examples may differ from what is described with respect to FIG. 11.

Figure 12:
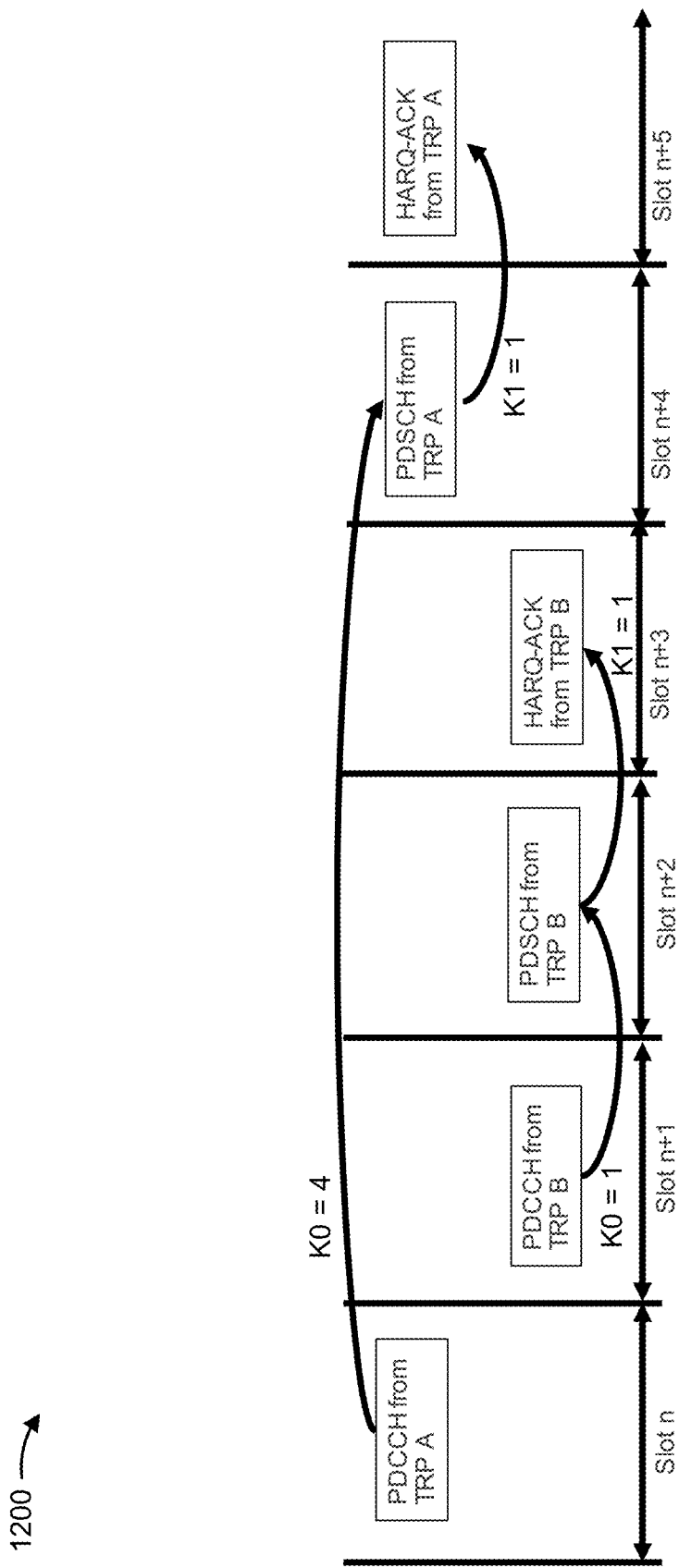

FIG. 12 is a diagram illustrating an example 1200 of scheduling timelines for multi-TRP operations, in accordance with various aspects of the present disclosure.

FIG. 12 shows an example where the scheduling rule indicates that out-of-order scheduling is not permitted across TRPs 508 for some communications, and that out-of-order scheduling is permitted across TRPs 508 for other communications. In this case, the TRPs 508 may use the same timeline for communications having a type for which out-of-order scheduling is not permitted. For example, the TRPs 508 are shown as both using a value of 1 for K1 when out-of-order scheduling is not permitted for triggering PDSCH communications subsequent HARQ ACK communications.

However, the TRPs 508 may use different timelines for communications having a type for which out-of-order scheduling is permitted. For example, TRP A is shown as using a value of 4 for K0, and TRP B is shown as using a value of 1 for K0, when out-of-order scheduling is permitted for triggering PDCCH communications and subsequent PDSCH communications.

Although FIG. 12 shows an example where the scheduling rule indicates that out-of-order scheduling is not permitted for triggering PDSCH communications subsequent HARQ ACK communications, and that out-of-order scheduling is permitted for triggering PDCCH communications and subsequent PDSCH communications, other combinations of types of communications for which out-of-order scheduling is permitted or is not permitted are possible. For example, out-of-order scheduling may be permitted for one or more of triggering PDCCH communications and subsequent PDSCH communications, triggering PDCCH communications and subsequent PUSCH communications, or triggering PDSCH communications subsequent HARQ ACK communications. Similarly, out-of-order scheduling may not be permitted for a different one or more of triggering PDCCH communications and subsequent PDSCH communications, triggering PDCCH communications and subsequent PUSCH communications, or triggering PDSCH communications subsequent HARQ ACK communications.

As indicated above, FIG. 12 is provided as an example. Other examples may differ from what is described with respect to FIG. 12.

Figure 13:
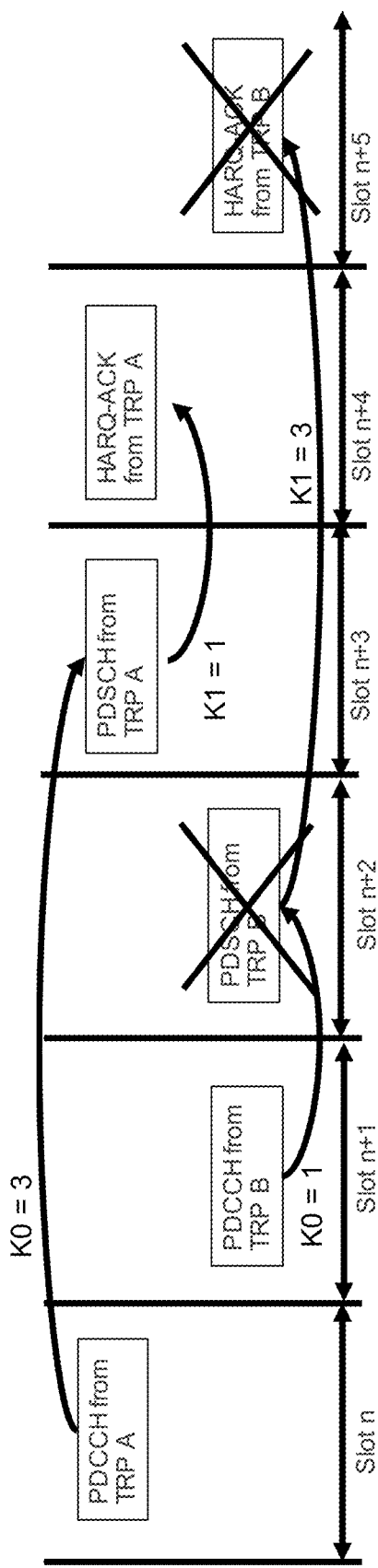

FIG. 13 is a diagram illustrating an example 1300 of scheduling timelines for multi-TRP operations, in accordance with various aspects of the present disclosure.

FIG. 13 shows an example where the scheduling rule indicates that out-of-order scheduling is not permitted across TRPs 508 for triggering PDSCH communications and subsequent HARQ ACK communications, and the dropping rule indicates, for example, that a later-received triggering communication is to be dropped when the scheduling rule is violated. Thus, as shown, the UE 120 receives and processes a triggering and subsequent communication from TRP A, and drops a triggering and/or subsequent communication from TRP B that violates the rule (e.g., the PDSCH communication and the HARQ ACK communication). In some aspects, the UE 120 may determine that the scheduling rule has been violated because the Kx values for pairs of communications, for which out-of-order scheduling is not permitted, do not match. Although FIG. 13 is described in connection with a dropping rule that a later-received triggering communication is to be dropped, another dropping rule may be used, as described elsewhere herein.

As indicated above, FIG. 13 is provided as an example. Other examples may differ from what is described with respect to FIG. 13.

Figure 14:
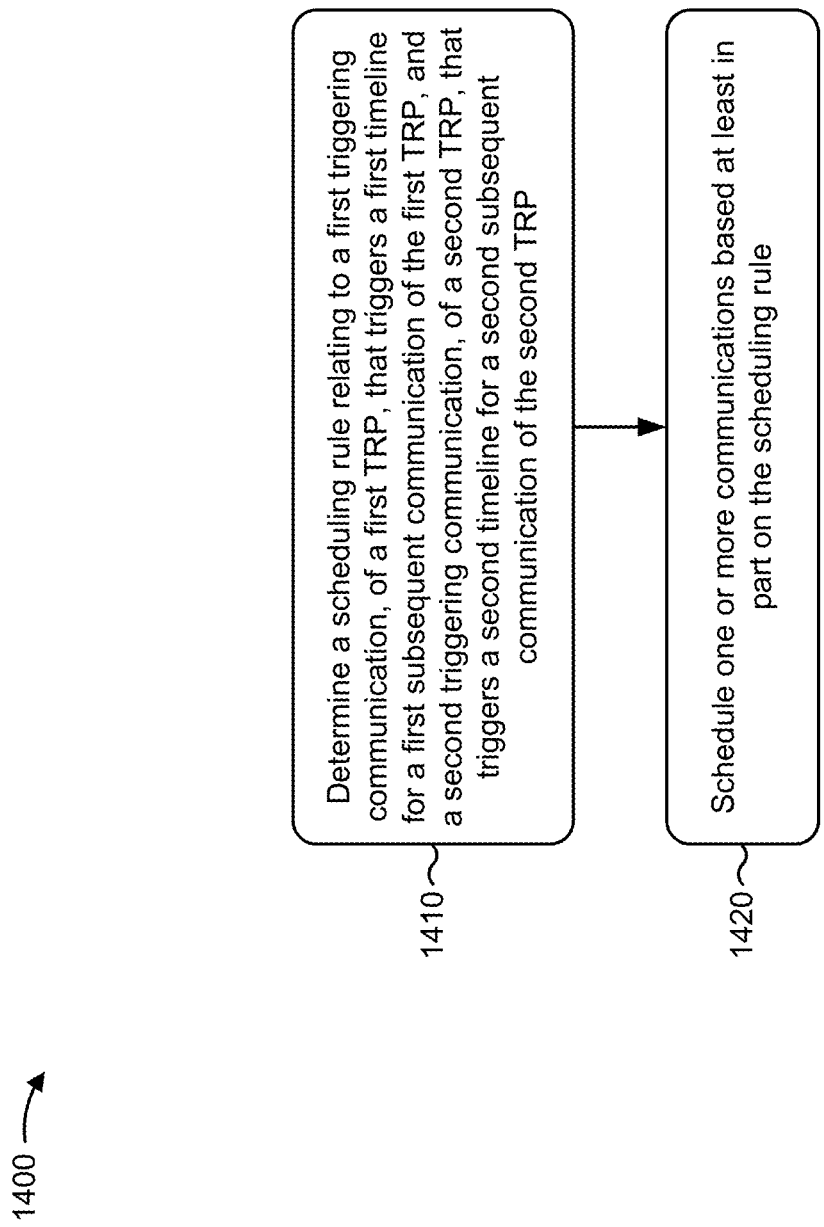
FIGS. 14-15 are diagrams illustrating example processes relating to scheduling timelines for multi-TRP operations, in accordance with various aspects of the present disclosure.

FIG. 14 is a diagram illustrating an example process 1400 performed, for example, by a base station, in accordance with various aspects of the present disclosure. Example process 1400 is an example where a base station (e.g., base station 110, a single TRP 508, multiple TRPs 508, and/or the like) performs operations relating to scheduling timelines for multi-TRP operations.

As shown in FIG. 14, in some aspects, process 1400 may include determining a scheduling rule relating to a first triggering communication, of a first transmit receive point (TRP), that triggers a first timeline for a first subsequent communication of the first TRP, and a second triggering communication, of a second TRP, that triggers a second timeline for a second subsequent communication of the second TRP (block 1410). For example, the base station (e.g., using controller/processor 240, memory 242, and/or the like) may determine a scheduling rule, as described above. In some aspects, the scheduling rule may relate to a first triggering communication, of a first TRP, that triggers a first timeline for a first subsequent communication of the first TRP. In some aspects, the scheduling rule may relate to a second triggering communication, of a second TRP, that triggers a second timeline for a second subsequent communication of the second TRP. In some aspects, the scheduling rule indicates whether the first subsequent communication is permitted to start before a start of the second subsequent communication when the first triggering communication starts after a start of the second triggering communication. In some aspects, the scheduling rule indicates whether the first subsequent communication is permitted to start before an end of the second subsequent communication when the first triggering communication ends after an end of the second triggering communication.

As further shown in FIG. 14, in some aspects, process 1400 may include scheduling one or more communications based at least in part on the scheduling rule (block 1420). For example, the base station (e.g., using controller/processor 240, memory 242, scheduler 246, and/or the like) may schedule one or more communications based at least in part on the scheduling rule, as described above.

Process 1400 may include additional aspects, such as any single aspect and/or any combination of aspects described below and/or in connection with one or more other processes described elsewhere herein.

In a first aspect, the first triggering communication and the second triggering communication are physical downlink control channel (PDCCH) communications, and the first subsequent communication and the second subsequent communication are physical downlink shared channel (PDSCH) communications. In a second aspect, alone or in combination with the first aspect, the first triggering communication and the second triggering communication are PDCCH communications, and the first subsequent communication and the second subsequent communication are physical uplink shared channel (PUSCH) communications. In a third aspect, alone or in combination with one or more of the first and second aspects, the first triggering communication and the second triggering communication are PDSCH communications, and the first subsequent communication and the second subsequent communication are hybrid automatic repeated request (HARQ) acknowledgement (ACK) communications.

In a fourth aspect, alone or in combination with one or more of the first through third aspects, the first triggering communication and the second triggering communication are a same first type of communication, and the first subsequent communication and the second subsequent communication are a same second type of communication. In a fifth aspect, alone or in combination with one or more of the first through fourth aspects, the first triggering communication and the first subsequent communication are associated with a first hybrid automatic repeated request (HARQ) process identifier. In a sixth aspect, alone or in combination with one or more of the first through fifth aspects, the second triggering communication and the second subsequent communication are associated with a second HARQ process identifier.

In a seventh aspect, alone or in combination with one or more of the first through sixth aspects, the scheduling rule indicates that the first subsequent communication is not permitted to start before a start of the second subsequent communication when the first triggering communication starts after a start of the second triggering communication. In an eighth aspect, alone or in combination with one or more of the first through seventh aspects, the first timeline and the second timeline are a same value.

In a ninth aspect, alone or in combination with one or more of the first through eighth aspects, the first TRP and the second TRP are configured to use at least one of: a same timeline between a physical downlink control channel (PDCCH) communication and a corresponding physical downlink shared channel (PDSCH) communication scheduled by the PDCCH communication, a same timeline between a PDCCH communication and a corresponding physical uplink shared channel (PUSCH) communication scheduled by the PDCCH communication, a same timeline between a PDSCH communication and a corresponding hybrid automatic repeated request (HARQ) acknowledgement (ACK) communication for the PDSCH communication, or a combination thereof.

In a tenth aspect, alone or in combination with one or more of the first through ninth aspects, the first TRP and the second TRP are configured to use a same timeline for at least one of: a physical downlink control channel (PDCCH) communication and a corresponding physical downlink shared channel (PDSCH) communication scheduled by the PDCCH communication, a PDCCH communication and a corresponding physical uplink shared channel (PUSCH) communication scheduled by the PDCCH communication, or a PDSCH communication and a corresponding hybrid automatic repeated request (HARQ) acknowledgement (ACK) communication for the PDSCH communication. In an eleventh aspect, alone or in combination with one or more of the first through tenth aspects, the first TRP and the second TRP are configured to use different timelines for at least one of: a PDCCH communication and a corresponding PDSCH communication scheduled by the PDCCH communication, a PDCCH communication and a corresponding PUSCH communication scheduled by the PDCCH communication, or a PDSCH communication and a corresponding HARQ ACK communication for the PDSCH communication.

In a twelfth aspect, alone or in combination with one or more of the first through eleventh aspects, at least one of the first timeline or the second timeline is indicated between the first TRP and the second TRP. In a thirteenth aspect, alone or in combination with one or more of the first through twelfth aspects, at least one of the first timeline or the second timeline is indicated to a user equipment (UE).

In a fourteenth aspect, alone or in combination with one or more of the first through thirteenth aspects, the scheduling rule indicates that the first subsequent communication is permitted to start before a start of the second subsequent communication when the first triggering communication starts after a start of the second triggering communication. In a fifteenth aspect, alone or in combination with one or more of the first through fourteenth aspects, the scheduling rule further relates to a third triggering communication, of the first TRP, that triggers a third timeline for a third subsequent communication of the first TRP. In a sixteenth aspect, alone or in combination with one or more of the first through fifteenth aspects, the scheduling rule indicates that the first subsequent communication is not permitted to start before a start of the third subsequent communication when the first triggering communication starts after a start of the third triggering communication.

In a seventeenth aspect, alone or in combination with one or more of the first through sixteenth aspects, the scheduling rule indicates, for a specific carrier, whether the first subsequent communication is permitted to start before a start of the second subsequent communication when the first triggering communication starts after a start of the second triggering communication. In an eighteenth aspect, alone or in combination with one or more of the first through seventeenth aspects, the scheduling rule indicates, across all carriers, whether the first subsequent communication is permitted to start before a start of the second subsequent communication when the first triggering communication starts after a start of the second triggering communication.

In a nineteenth aspect, alone or in combination with one or more of the first through eighteenth aspects, the first triggering communication, the first subsequent communication, the second triggering communication, and the second subsequent communication are on a same carrier. In a twentieth aspect, alone or in combination with one or more of the first through nineteenth aspects, the first triggering communication and the first subsequent communication are on a first carrier, and wherein the second triggering communication and the second subsequent communication are on a second carrier.

In a twenty-first aspect, alone or in combination with one or more of the first through twentieth aspects, a size of a hybrid automatic repeated request (HARQ) acknowledgement (ACK) codebook is changed after a delay based at least in part on a determination that a carrier has been activated or deactivated for the first TRP or the second TRP.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
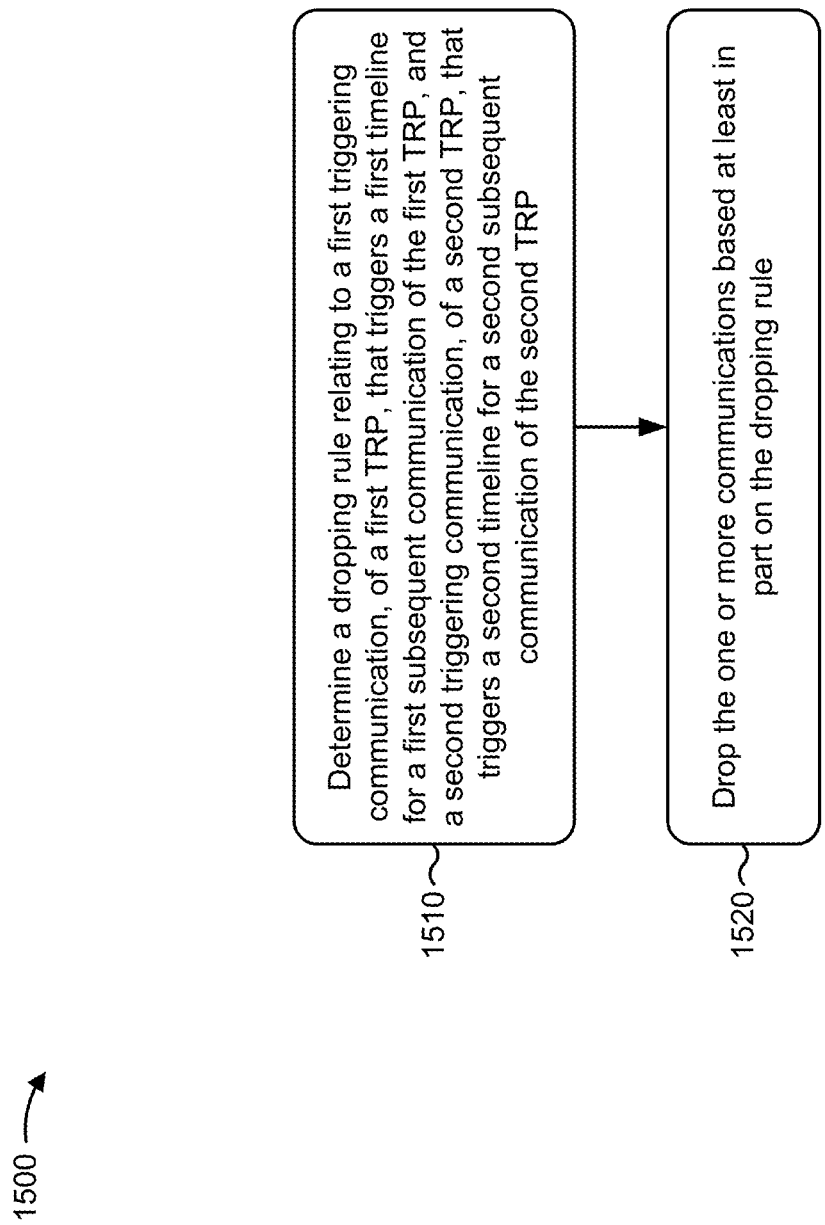

FIG. 15 is a diagram illustrating an example process 1500 performed, for example, by a UE, in accordance with various aspects of the present disclosure. Example process 1500 is an example where a UE (e.g., UE 120 and/or the like) performs operations relating to scheduling timelines for multi-TRP operations.

As shown in FIG. 15, in some aspects, process 1500 may include determining a dropping rule relating to: a first triggering communication, of a first transmit receive point (TRP), that triggers a first timeline for a first subsequent communication of the first TRP, and a second triggering communication, of a second TRP, that triggers a second timeline for a second subsequent communication of the second TRP (block 1510). For example, the UE (e.g., using controller/processor 280, memory 282, and/or the like) may determine a dropping rule, as described above. In some aspects, the dropping rule may relate to a first triggering communication, of a first TRP, that triggers a first timeline for a first subsequent communication of the first TRP. In some aspects, the dropping rule may relate to a second triggering communication, of a second TRP, that triggers a second timeline for a second subsequent communication of the second TRP. In some aspects, the dropping rule indicates one or more communications to be dropped when the first triggering communication starts after a start of the second triggering communication and the first subsequent communication starts before a start of the second subsequent communication. In some aspects, the dropping rule indicates one or more communications to be dropped when first triggering communication ends after an end of the second triggering communication and the first subsequent communication starts before an end of the second subsequent communication.

As further shown in FIG. 15, in some aspects, process 1500 may include dropping the one or more communications based at least in part on the dropping rule (block 1520). For example, the UE (e.g., using antenna 252, DEMOD 254, MIMO detector 256, receive processor 258, controller/processor 280, memory 282, transmit processor 264, TX MIMO processor 266, MOD 254, and/or the like) may drop the one or more communications based at least in part on the dropping rule, as described above.

Process 1500 may include additional aspects, such as any single aspect and/or any combination of aspects described below and/or in connection with one or more other processes described elsewhere herein.

In a first aspect, the first triggering communication and the second triggering communication are physical downlink control channel (PDCCH) communications, and the first subsequent communication and the second subsequent communication are physical downlink shared channel (PDSCH) communications. In a second aspect, alone or in combination with the first aspect, the first triggering communication and the second triggering communication are PDCCH communications, and the first subsequent communication and the second subsequent communication are physical uplink shared channel (PUSCH) communications. In a third aspect, alone or in combination with one or more of the first and second aspects, the first triggering communication and the second triggering communication are PDSCH communications, and the first subsequent communication and the second subsequent communication are hybrid automatic repeated request (HARQ) acknowledgement (ACK) communications.

In a fourth aspect, alone or in combination with one or more of the first through third aspects, the first triggering communication and the second triggering communication are a same first type of communication, and the first subsequent communication and the second subsequent communication are a same second type of communication. In a fifth aspect, alone or in combination with one or more of the first through fourth aspects, the first triggering communication and the first subsequent communication are associated with a first hybrid automatic repeated request (HARQ) process identifier. In a sixth aspect, alone or in combination with one or more of the first through fifth aspects, the second triggering communication and the second subsequent communication are associated with a second HARQ process identifier.

In an eighth aspect, alone or in combination with one or more of the first through seventh aspects, the dropping rule indicates whether to drop: at least one of the first triggering communication or the first subsequent communication, or at least one of the second triggering communication or the second subsequent communication. In a ninth aspect, alone or in combination with one or more of the first through eighth aspects, the dropping rule is based at least in part on at least one of: a later-occurring communication of the first triggering communication and the second triggering communication, a later-occurring communication of the first subsequent communication and the second subsequent communication, an earlier-occurring communication of the first triggering communication and the second triggering communication, an earlier-occurring communication of the first subsequent communication and the second subsequent communication, a TRP identifier of at least one of the first TRP or the second TRP, whether the first TRP or the second TRP is a master TRP, whether the first TRP or the second TRP is a slave TRP, a quasi co-location relationship associated with at least one of the first triggering communication or the second triggering communication, a transmission configuration indicator (TCI) state associated with at least one of the first triggering communication or the second triggering communication, a control resource set (CORESET) identifier associated with at least one of the first triggering communication or the second triggering communication, a signal quality associated with at least one of the first triggering communication or the second triggering communication, a carrier on which the first triggering communication or the second triggering communication is carried, the first timeline or the second timeline, or a combination thereof. In a tenth aspect, alone or in combination with one or more of the first through ninth aspects, at least one of the first timeline or the second timeline is indicated to the UE.

In an eleventh aspect, alone or in combination with one or more of the first through tenth aspects, the dropping rule indicates the one or more communications to be dropped when the first triggering communication and the second triggering communication are on a same carrier. In a twelfth aspect, alone or in combination with one or more of the first through eleventh aspects, the dropping rule indicates the one or more communications to be dropped when the first triggering communication and the second triggering communication are on different carriers.

In a thirteenth aspect, alone or in combination with one or more of the first through twelfth aspects, a size of hybrid automatic repeated request (HARQ) acknowledgement (ACK) codebook is changed after a delay based at least in part on a determination that a carrier has been activated or deactivated for the first TRP or the second TRP. In a fourteenth aspect, alone or in combination with one or more of the first through thirteenth aspects, a hybrid automatic repeated request (HARQ) acknowledgement (ACK) codebook rule is indicated to the UE after a carrier has been activated or deactivated for the first TRP or the second TRP. In a fifteenth aspect, alone or in combination with one or more of the first through fourteenth aspects, the HARQ ACK codebook rule indicates that the UE is to transmit a negative acknowledgement (NACK) for a deactivated carrier. In a sixteenth aspect, alone or in combination with one or more of the first through fifteenth aspects, the HARQ ACK codebook rule indicates that the UE is to bundle acknowledgement (ACK) or negative acknowledgement (ACK/NACK) feedback for an activated carrier with a default carrier.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a base station, comprising:
  determining a scheduling rule relating to:
    a first triggering communication, of a first transmit receive point (TRP), that triggers a first timeline for a first subsequent communication of the first TRP, and a second triggering communication, of a second TRP, that triggers a second timeline for a second subsequent communication of the second TRP,
wherein the scheduling rule indicates whether the first subsequent communication is permitted to start before an end of the second subsequent communication when the first triggering communication ends after an end of the second triggering communication; and scheduling one or more communications based at least in part on the scheduling rule.

2. The method of claim 1, wherein at least one of the first timeline or the second timeline is indicated between the first TRP and the second TRP.

3. The method of claim 1, wherein at least one of the first timeline or the second timeline is indicated to a user equipment (UE).

4. The method of claim 1, wherein the scheduling rule indicates that the first subsequent communication is permitted to start before the end of the second subsequent communication when the first triggering communication ends after the end of the second triggering communication.

5. The method of claim 4, wherein the scheduling rule further relates to a third triggering communication, of the first TRP, that triggers a third timeline for a third subsequent communication of the first TRP; and
wherein the scheduling rule indicates that the first subsequent communication is not permitted to start before the end of the second subsequent communication when the first triggering communication ends after the end of the second triggering communication.

6. The method of claim 1, wherein:
the first triggering communication and the second triggering communication are physical downlink control channel (PDCCH) communications, and the first subsequent communication and the second subsequent communication are physical downlink shared channel (PDSCH) communications,
the first triggering communication and the second triggering communication are PDCCH communications, and the first subsequent communication and the second subsequent communication are physical uplink shared channel (PUSCH) communications, or
the first triggering communication and the second triggering communication are PDSCH communications, and the first subsequent communication and the second subsequent communication are hybrid automatic repeated request (HARQ) acknowledgement (ACK) communications.

7. The method of claim 1, wherein the first triggering communication and the second triggering communication are a same first type of communication, and the first subsequent communication and the second subsequent communication are a same second type of communication.

8. The method of claim 1, wherein the first triggering communication and the first subsequent communication are associated with a first hybrid automatic repeated request (HARQ) process identifier, and wherein the second triggering communication and the second subsequent communication are associated with a second HARQ process identifier.

9. The method of claim 1, wherein the scheduling rule indicates that the first subsequent communication is not permitted to start before the end of the second subsequent communication when the first triggering communication ends after the end of the second triggering communication.

10. The method of claim 1, wherein the first timeline and the second timeline are a same value.

11. The method of claim 1, wherein the first TRP and the second TRP are configured to use at least one of:
a same timeline between a first physical downlink control channel (PDCCH) communication and a corresponding first physical downlink shared channel (PDSCH) communication scheduled by the first PDCCH communication,
a same timeline between a second PDCCH communication and a corresponding physical uplink shared channel (PUSCH) communication scheduled by the second PDCCH communication, or
a same timeline between a second PDSCH communication and a corresponding hybrid automatic repeated request (HARD) acknowledgement (ACK) communication for the second PDSCH communication.

12. The method of claim 1, wherein the scheduling rule indicates, for a specific carrier, whether the first subsequent communication is permitted to start before a start of the second subsequent communication when the first triggering communication starts after a start of the second triggering communication.

13. The method of claim 1, wherein the scheduling rule indicates, across all carriers, whether the first subsequent communication is permitted to start before a start of the second subsequent communication when the first triggering communication starts after a start of the second triggering communication.

14. The method of claim 1, wherein the first triggering communication, the first subsequent communication, the second triggering communication, and the second subsequent communication are on a same carrier.

15. The method of claim 1, wherein the first triggering communication and the first subsequent communication are on a first carrier, and wherein the second triggering communication and the second subsequent communication are on a second carrier.

16. The method of claim 1, wherein a size of a hybrid automatic repeated request (HARQ) acknowledgement (ACK) codebook is changed after a delay based at least in part on a determination that a carrier has been activated or deactivated for the first TRP or the second TRP.

17. A method of wireless communication performed by a user equipment (UE), comprising:
determining a dropping rule relating to:
a first triggering communication, of a first transmit receive point (TRP), that triggers a first timeline for a first subsequent communication of the first TRP, and
a second triggering communication, of a second TRP, that triggers a second timeline for a second subsequent communication of the second TRP,
wherein the dropping rule indicates one or more communications to be dropped when first triggering communication ends after an end of the second triggering communication and the first subsequent communication starts before an end of the second subsequent communication; and
dropping the one or more communications based at least in part on the dropping rule.

18. The method of claim 17, wherein:
the first triggering communication and the second triggering communication are physical downlink control channel (PDCCH) communications, and the first subsequent communication and the second subsequent communication are physical downlink shared channel (PDSCH) communications, the first triggering communication and the second triggering communication are PDCCH communications, and the first subsequent communication and the second subsequent communication are physical uplink shared channel (PUSCH) communications, or the first triggering communication and the second triggering communication are PDSCH communications, and the first subsequent communication and the second subsequent communication are hybrid automatic repeated request (HARD) acknowledgement (ACK) communications.

19. The method of claim 17, wherein the first triggering communication and the second triggering communication are a same first type of communication, and the first subsequent communication and the second subsequent communication are a same second type of communication.

20. The method of claim 17, wherein the first triggering communication and the first subsequent communication are associated with a first hybrid automatic repeated request (HARQ) process identifier, and wherein the second triggering communication and the second subsequent communication are associated with a second HARQ process identifier.

21. The method of claim 17, wherein the dropping rule indicates whether to drop:
at least one of the first triggering communication or the first subsequent communication, or
at least one of the second triggering communication or the second subsequent communication.

22. The method of claim 17, wherein the dropping rule is based at least in part on at least one of:
a later-occurring communication of the first triggering communication and the second triggering communication,
a later-occurring communication of the first subsequent communication and the second subsequent communication,
an earlier-occurring communication of the first triggering communication and the second triggering communication,
an earlier-occurring communication of the first subsequent communication and the second subsequent communication,
a TRP identifier of at least one of the first TRP or the second TRP,
whether the first TRP or the second TRP is a master TRP,
whether the first TRP or the second TRP is a slave TRP,
a quasi co-location relationship associated with at least one of the first triggering communication or the second triggering communication,
a transmission configuration indicator (TCI) state associated with at least one of the first triggering communication or the second triggering communication,
a control resource set (CORESET) identifier associated with at least one of the first triggering communication or the second triggering communication,
a signal quality associated with at least one of the first triggering communication or the second triggering communication,
a carrier on which the first triggering communication or the second triggering communication is carried, or
the first timeline or the second timeline.

23. The method of claim 17, wherein at least one of the first timeline or the second timeline is indicated to the UE.

24. The method of claim 17, wherein the dropping rule indicates the one or more communications to be dropped when the first triggering communication and the second triggering communication are on a same carrier.

25. The method of claim 17, wherein the dropping rule indicates the one or more communications to be dropped when the first triggering communication and the second triggering communication are on different carriers.

26. The method of claim 17, wherein a hybrid automatic repeated request (HARQ) acknowledgement (ACK) codebook rule is indicated to the UE after a carrier has been activated or deactivated for the first TRP or the second TRP.

27. A base station for wireless communication, comprising:
a memory; and
one or more processors coupled to the memory, the memory and the one or more processors configured to:
determine a scheduling rule relating to:
a first triggering communication, of a first transmit receive point (TRP), that triggers a first timeline for a first subsequent communication of the first TRP, and
a second triggering communication, of a second TRP, that triggers a second timeline for a second subsequent communication of the second TRP,
wherein the scheduling rule indicates at least one of:
whether the first subsequent communication is permitted to start before an end of the second subsequent communication when the first triggering communication ends after an end of the second triggering communication, or
whether the first subsequent communication is permitted to start before a start of the second subsequent communication when the first triggering communication starts after a start of the second triggering communication; and
schedule one or more communications based at least in part on the scheduling rule.

28. A user equipment (UE) for wireless communication, comprising:
a memory; and
one or more processors coupled to the memory, the memory and the one or more processors configured to:
determine a dropping rule relating to:
a first triggering communication, of a first transmit receive point (TRP), that triggers a first timeline for a first subsequent communication of the first TRP, and
a second triggering communication, of a second TRP, that triggers a second timeline for a second subsequent communication of the second TRP,
wherein the dropping rule indicates one or more communications to be dropped when at least one of:
the first triggering communication ends after an end of the second triggering communication and the first subsequent communication starts before an end of the second subsequent communication, or
the first triggering communication starts after a start of the second triggering communication and the first subsequent communication starts before a start of the second subsequent communication; and
drop the one or more communications based at least in part on the dropping rule.

29. The base station of claim 27, wherein:
the first triggering communication and the second triggering communication are physical downlink control channel (PDCCH) communications, and the first subsequent communication and the second subsequent communication are physical downlink shared channel (PDSCH) communications, the first triggering communication and the second triggering communication are PDCCH communications, and the first subsequent communication and the second subsequent communication are physical uplink shared channel (PUSCH) communications, or the first triggering communication and the second triggering communication are PDSCH communications, and the first subsequent communication and the second subsequent communication are hybrid automatic repeated request (HARD) acknowledgement (ACK) communications.

30. The UE of claim 28, wherein:

the first triggering communication and the second triggering communication are physical downlink control channel (PDCCH) communications, and the first subsequent communication and the second subsequent communication are physical downlink shared channel (PDSCH) communications, the first triggering communication and the second triggering communication are PDCCH communications, and the first subsequent communication and the second subsequent communication are physical uplink shared channel (PUSCH) communications, or the first triggering communication and the second triggering communication are PDSCH communications, and the first subsequent communication and the second subsequent communication are hybrid automatic repeated request (HARD) acknowledgement (ACK) communications.

* * * * *